A. SUNDH.
AUTOMATIC BLOCKING MECHANISM FOR STRIP MILLS.
APPLICATION FILED NOV. 21, 1917.
1,326,989.
Patented Jan. 6, 1920.
14 SHEETS—SHEET 12.
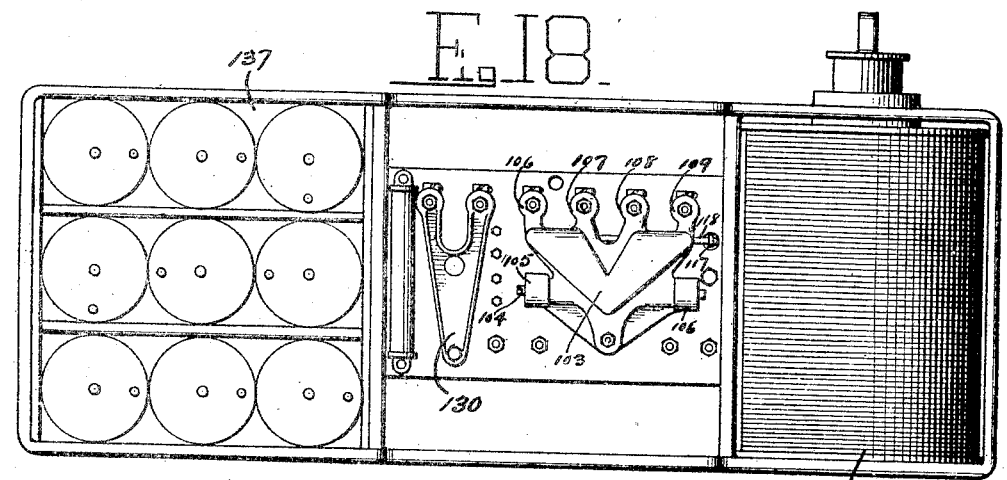
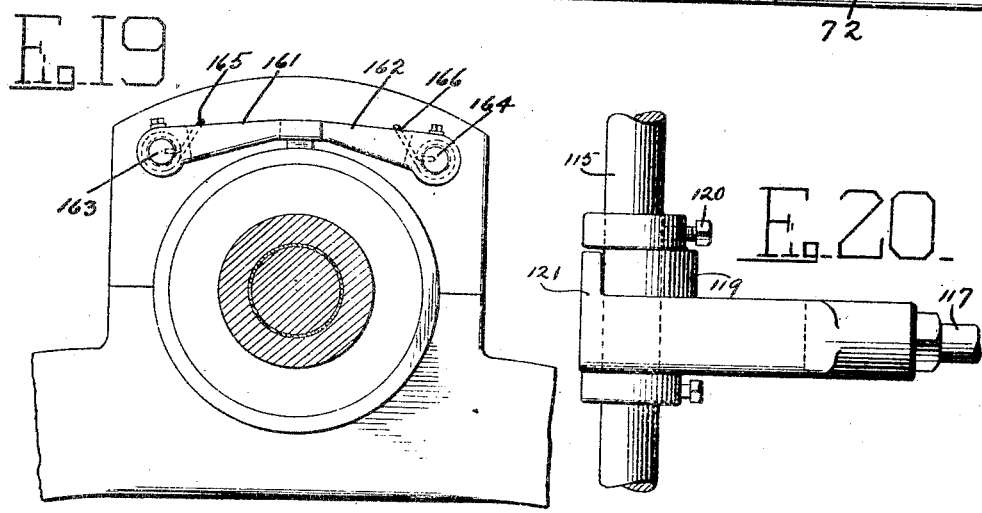
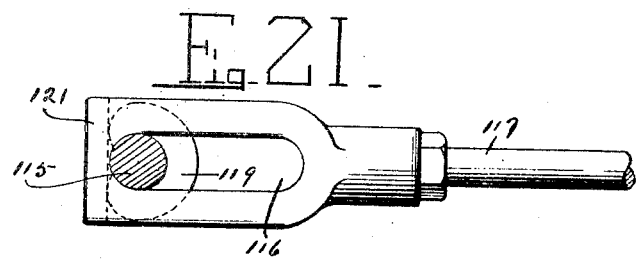
INVENTOR
August Sundh
BY
James G. Bethell
ATTORNEY

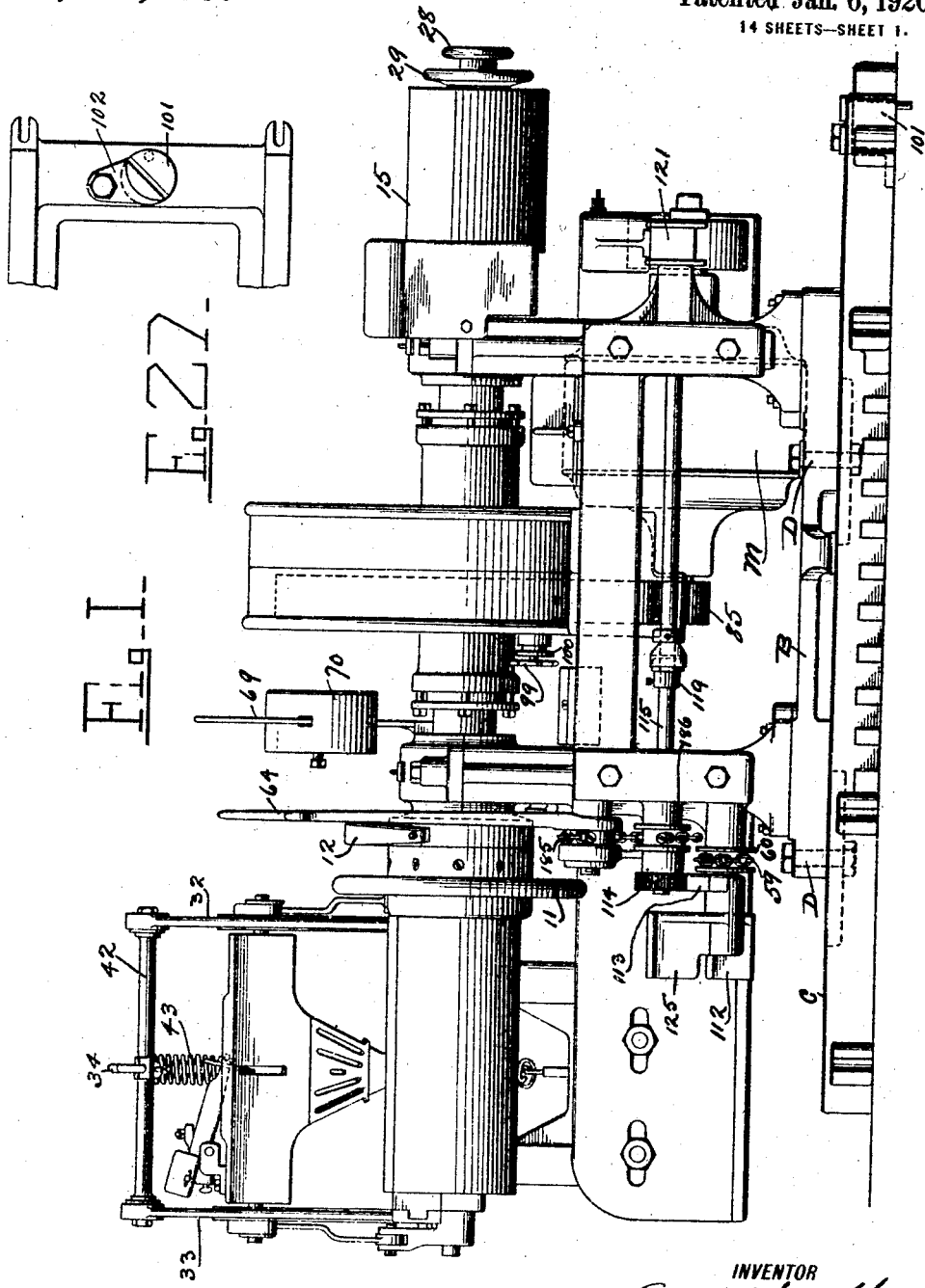

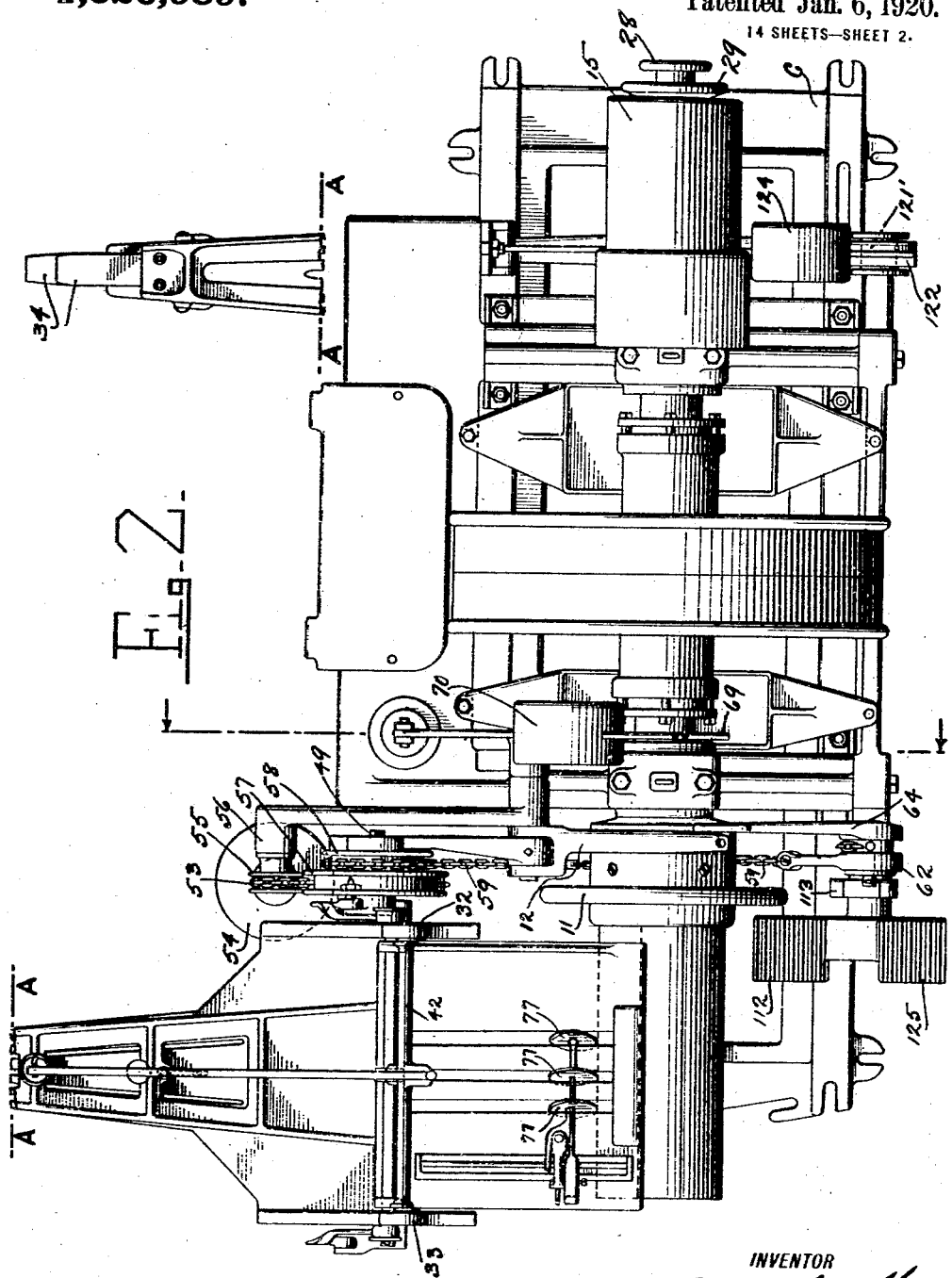

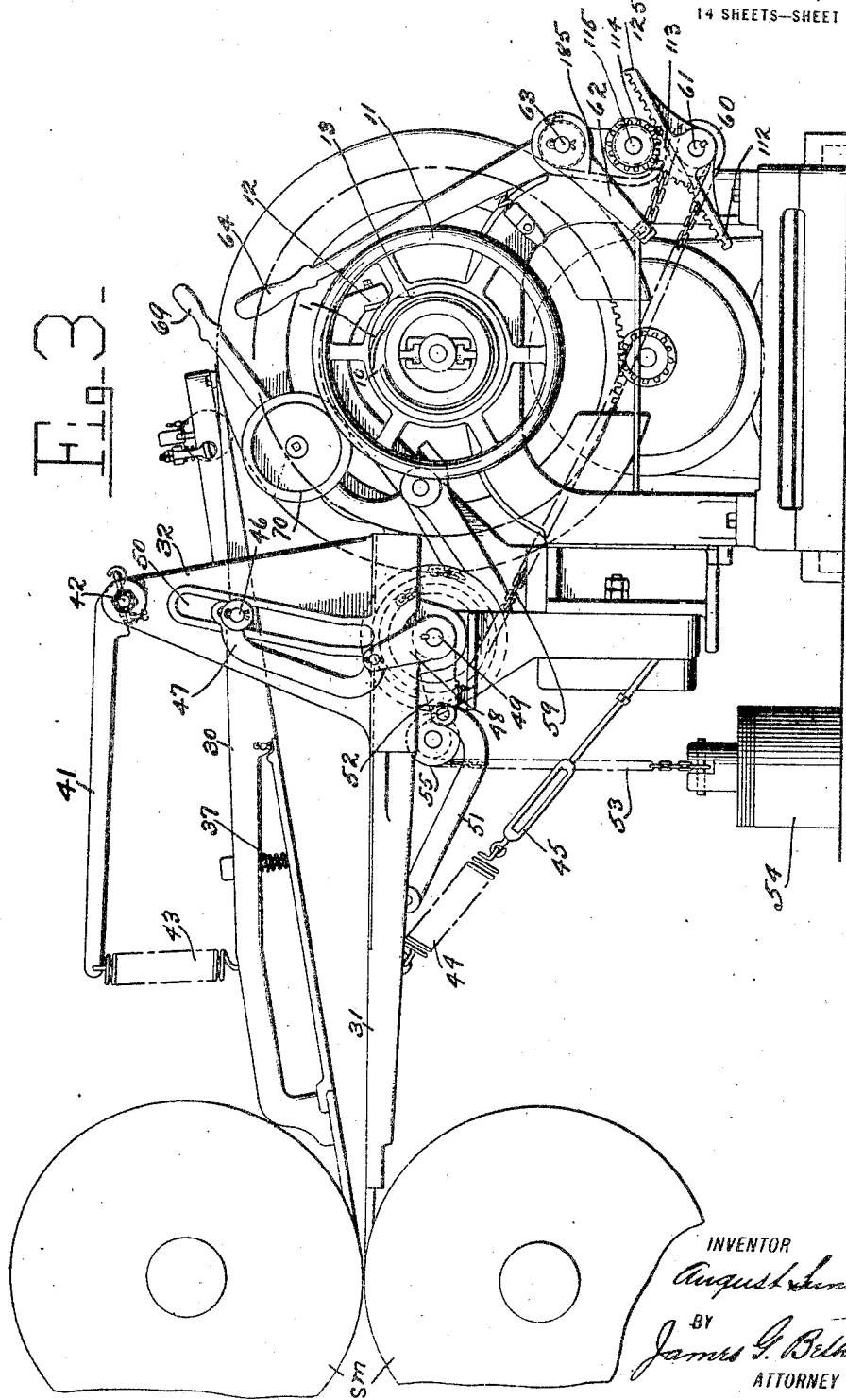

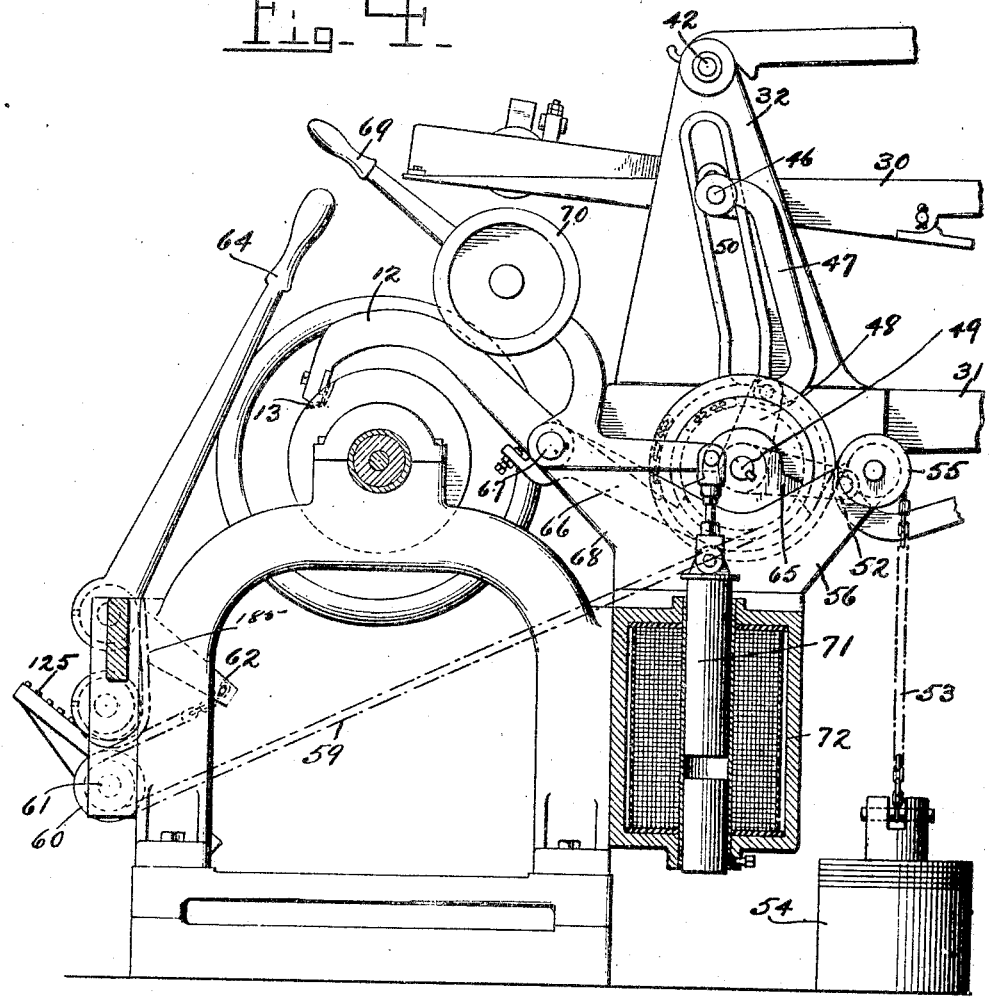

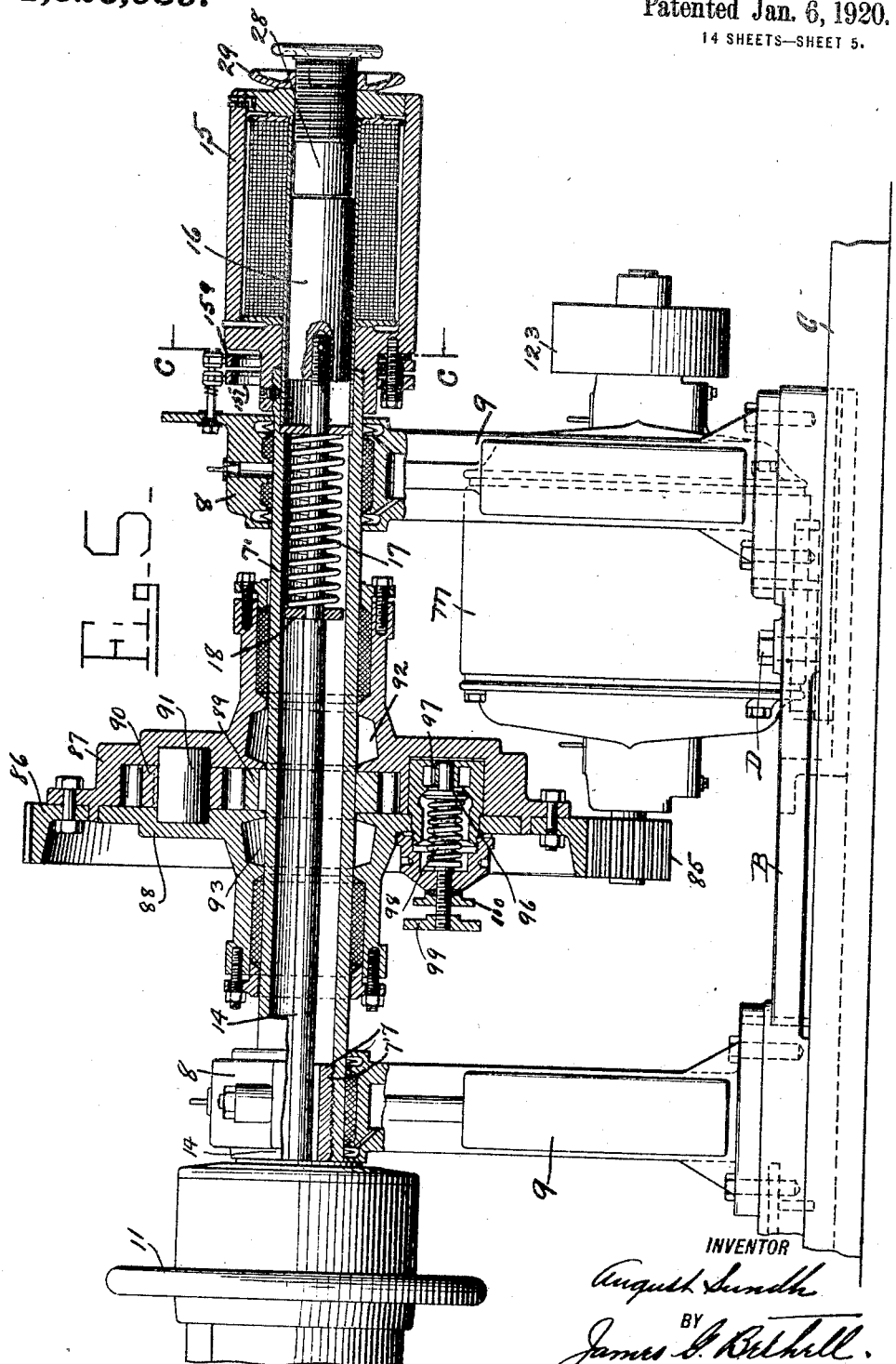

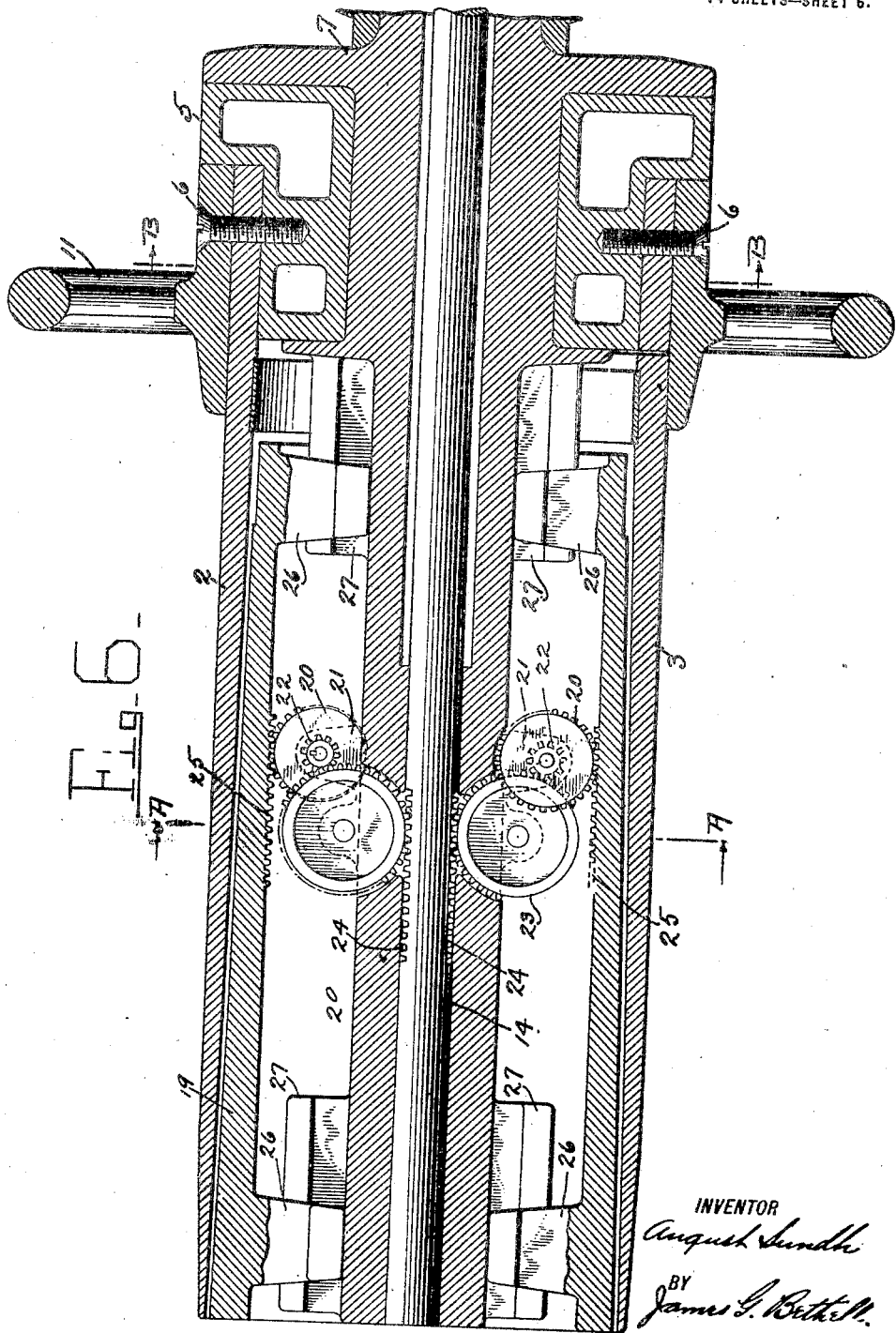

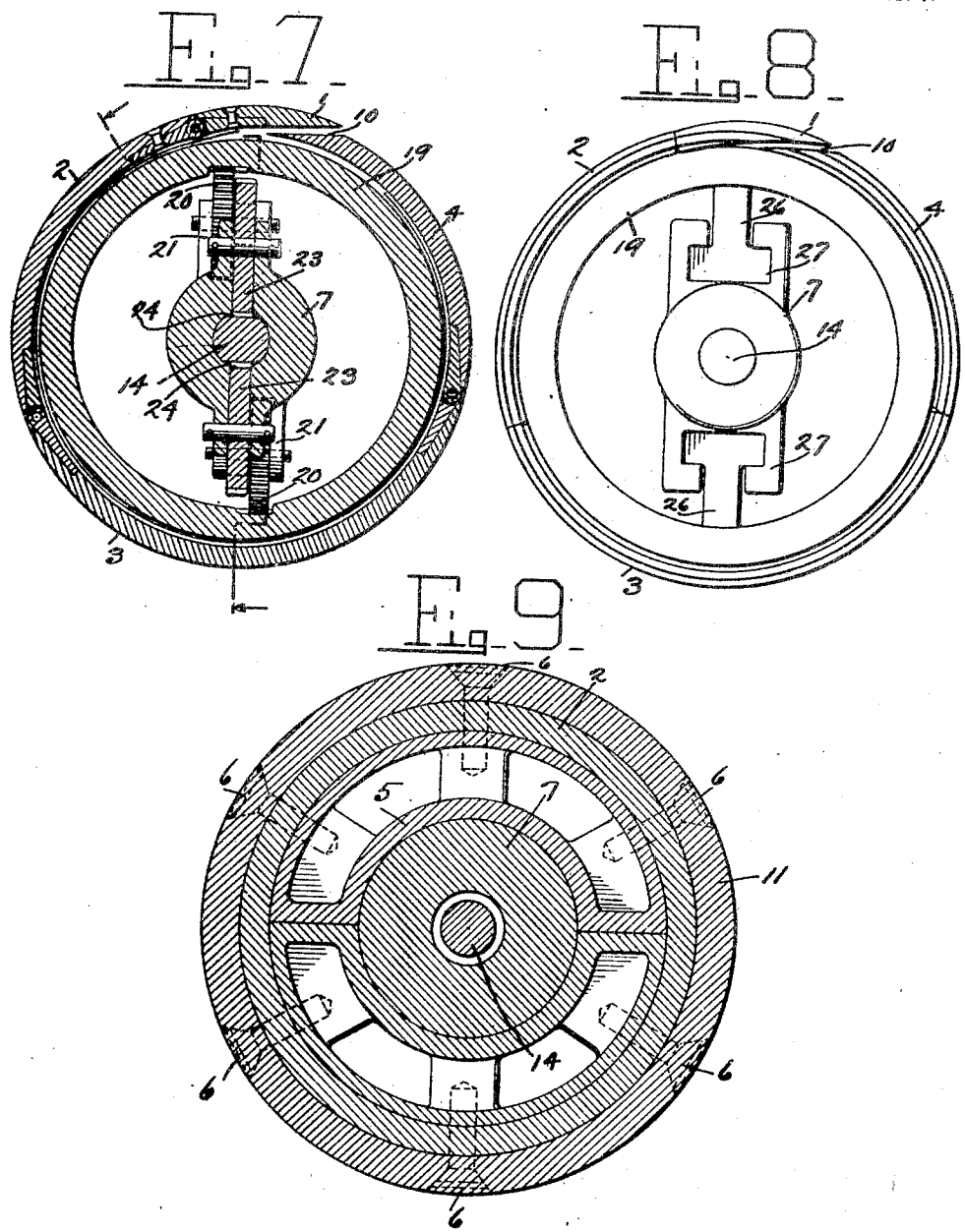

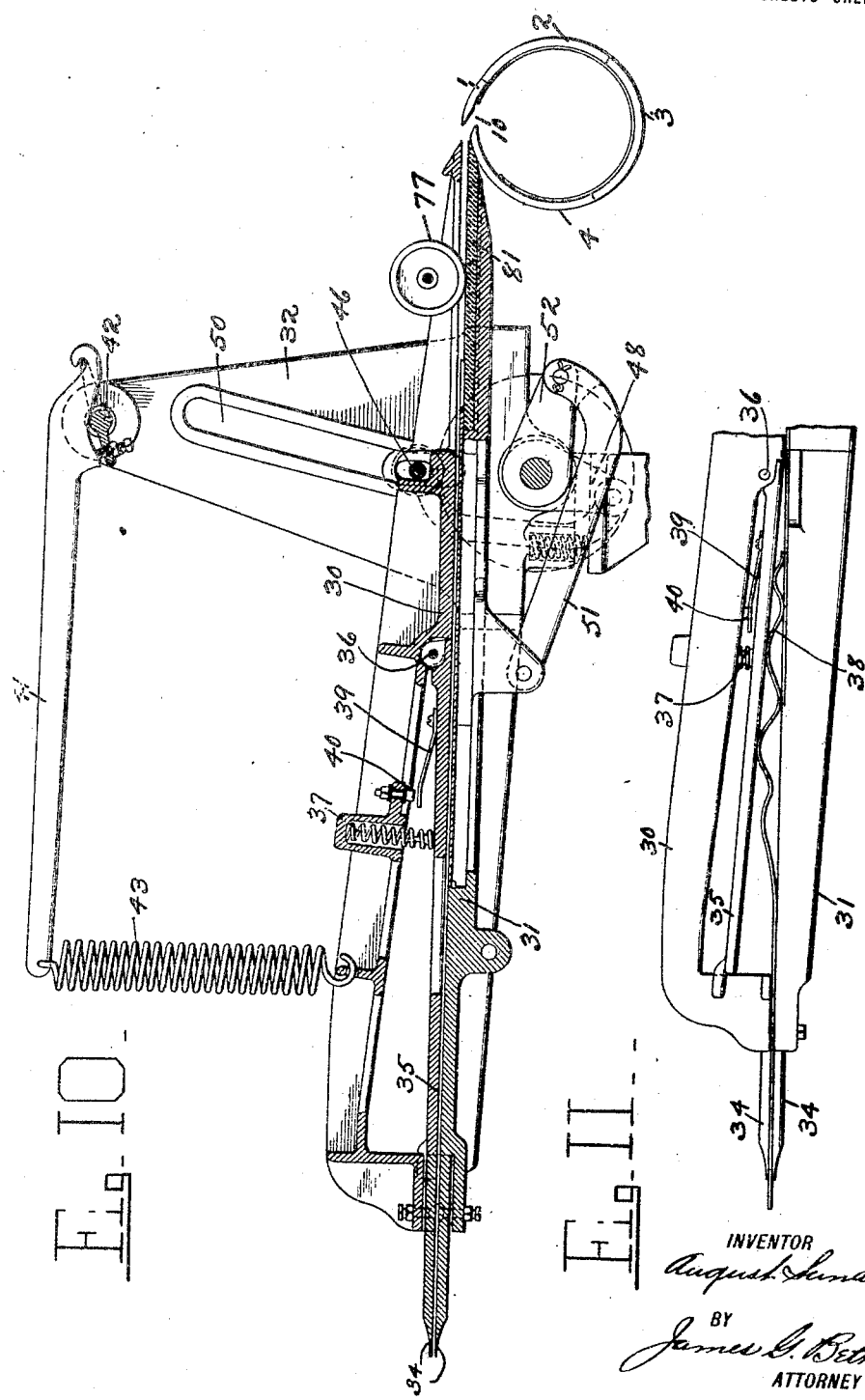

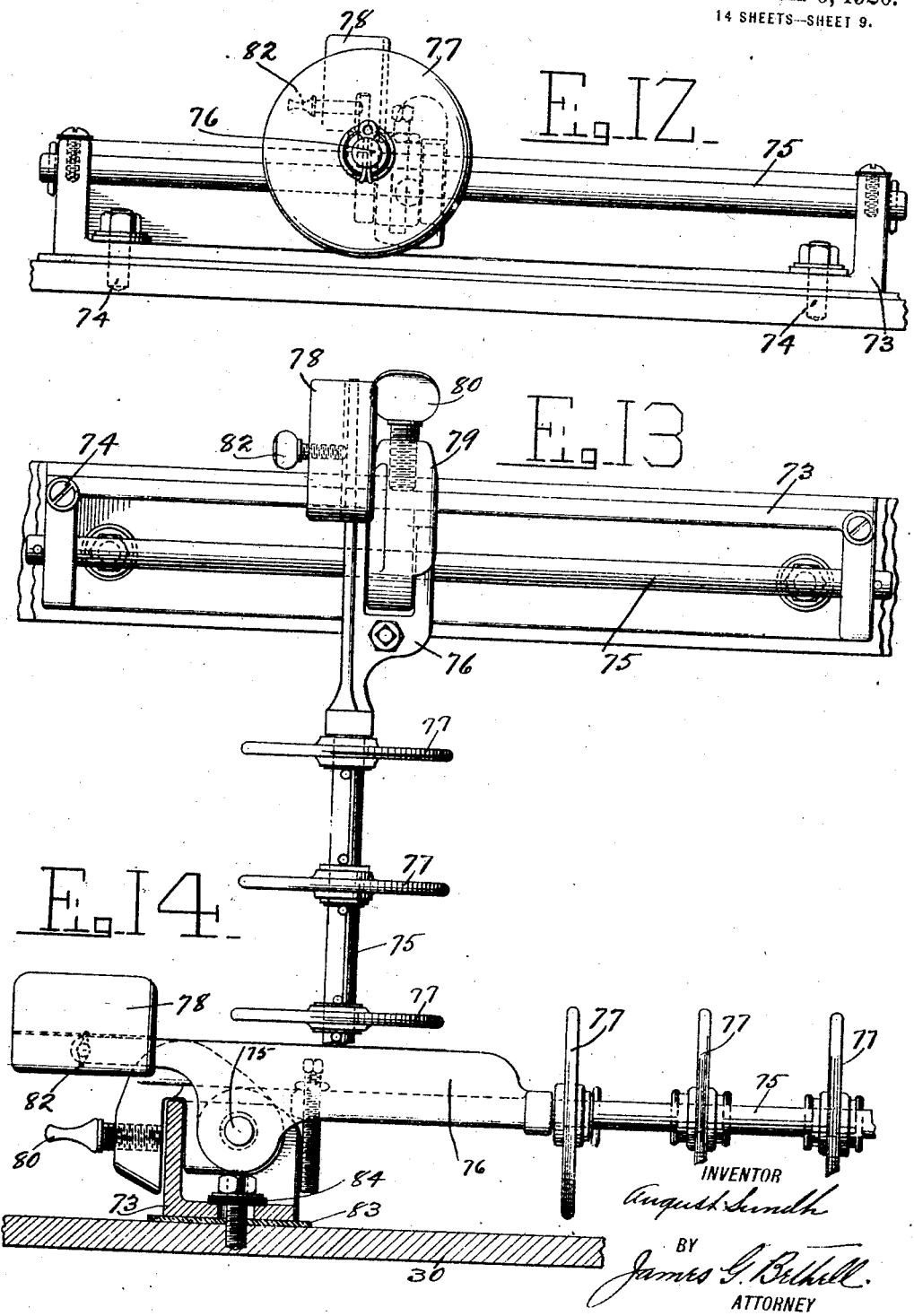

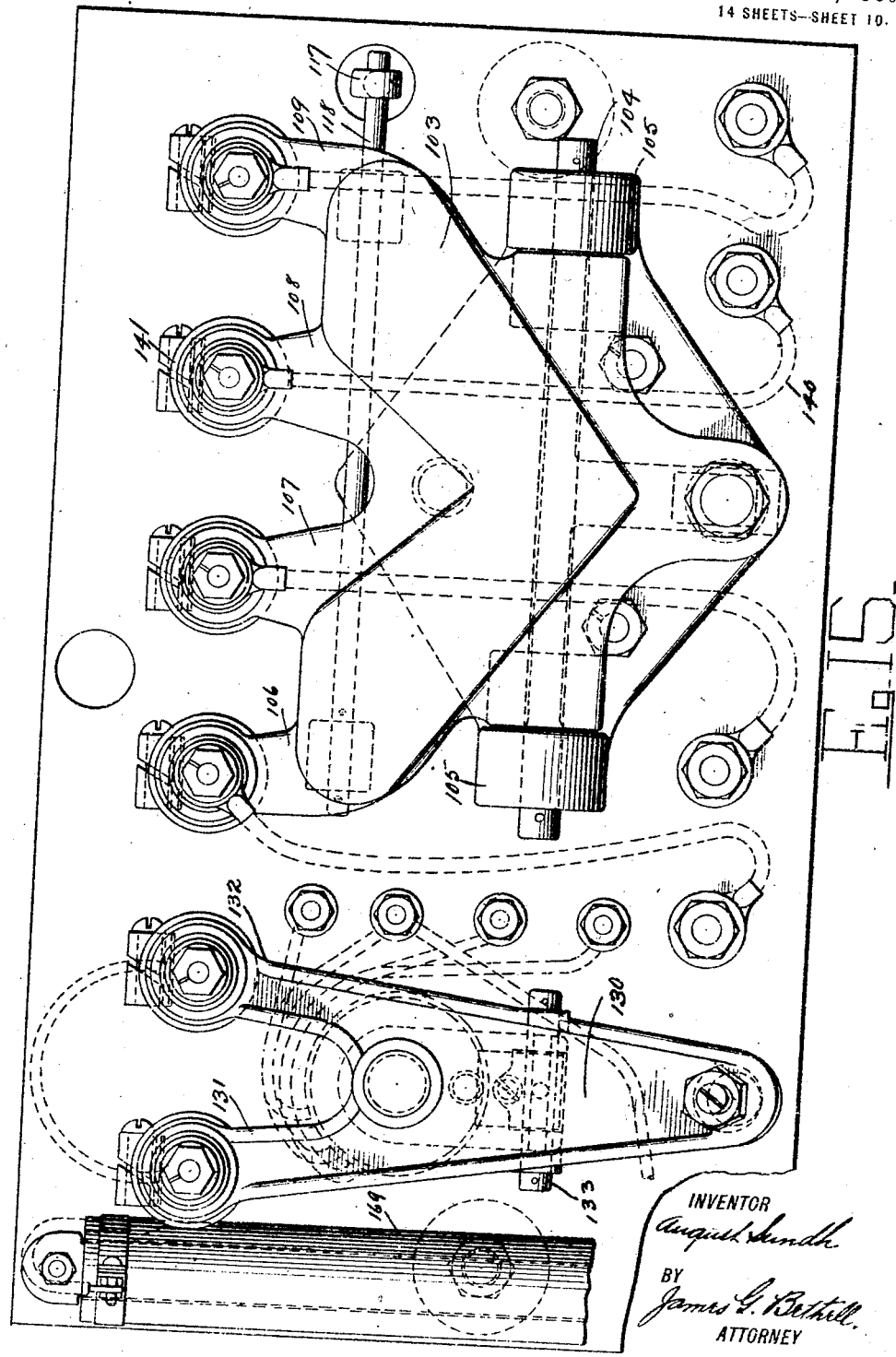

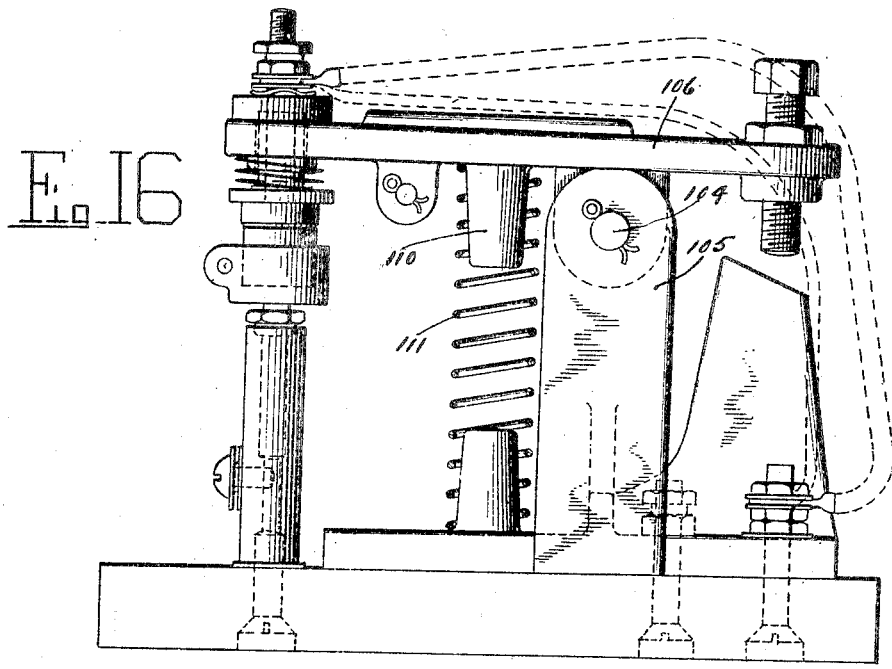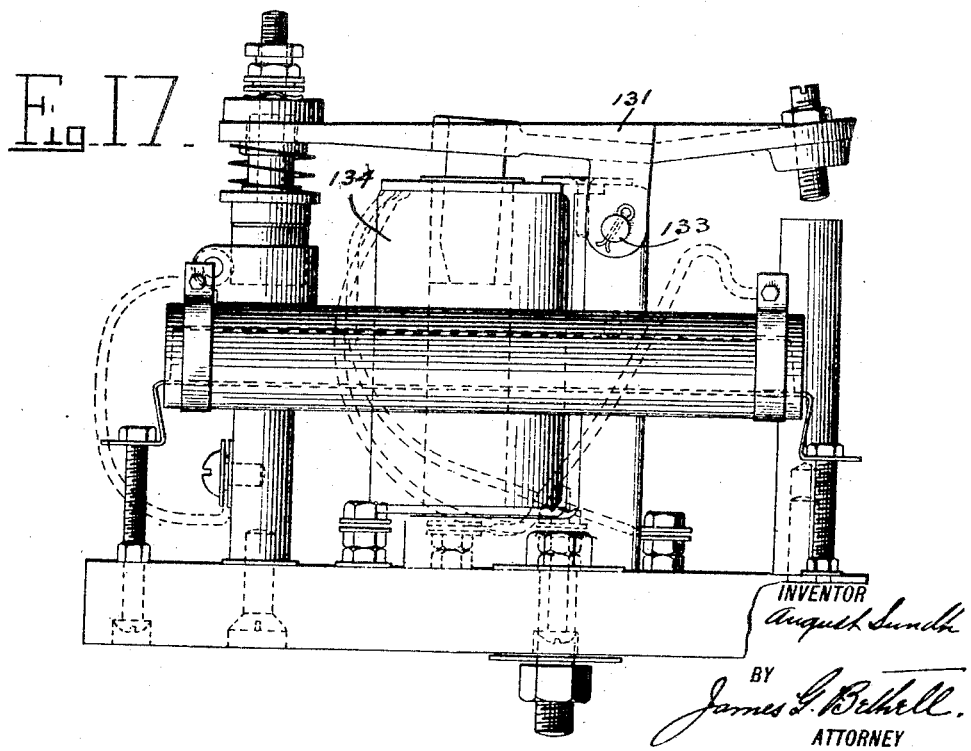

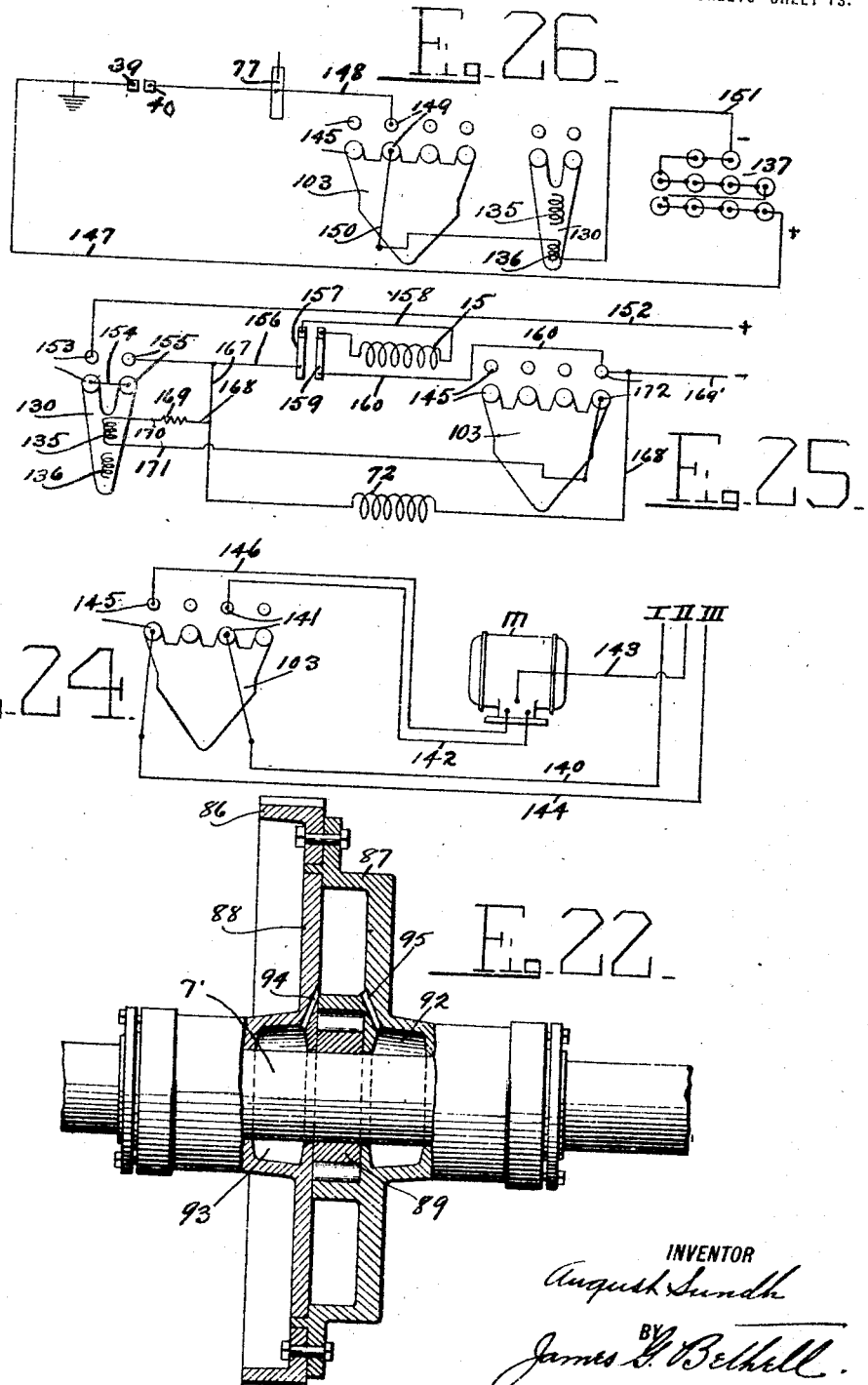

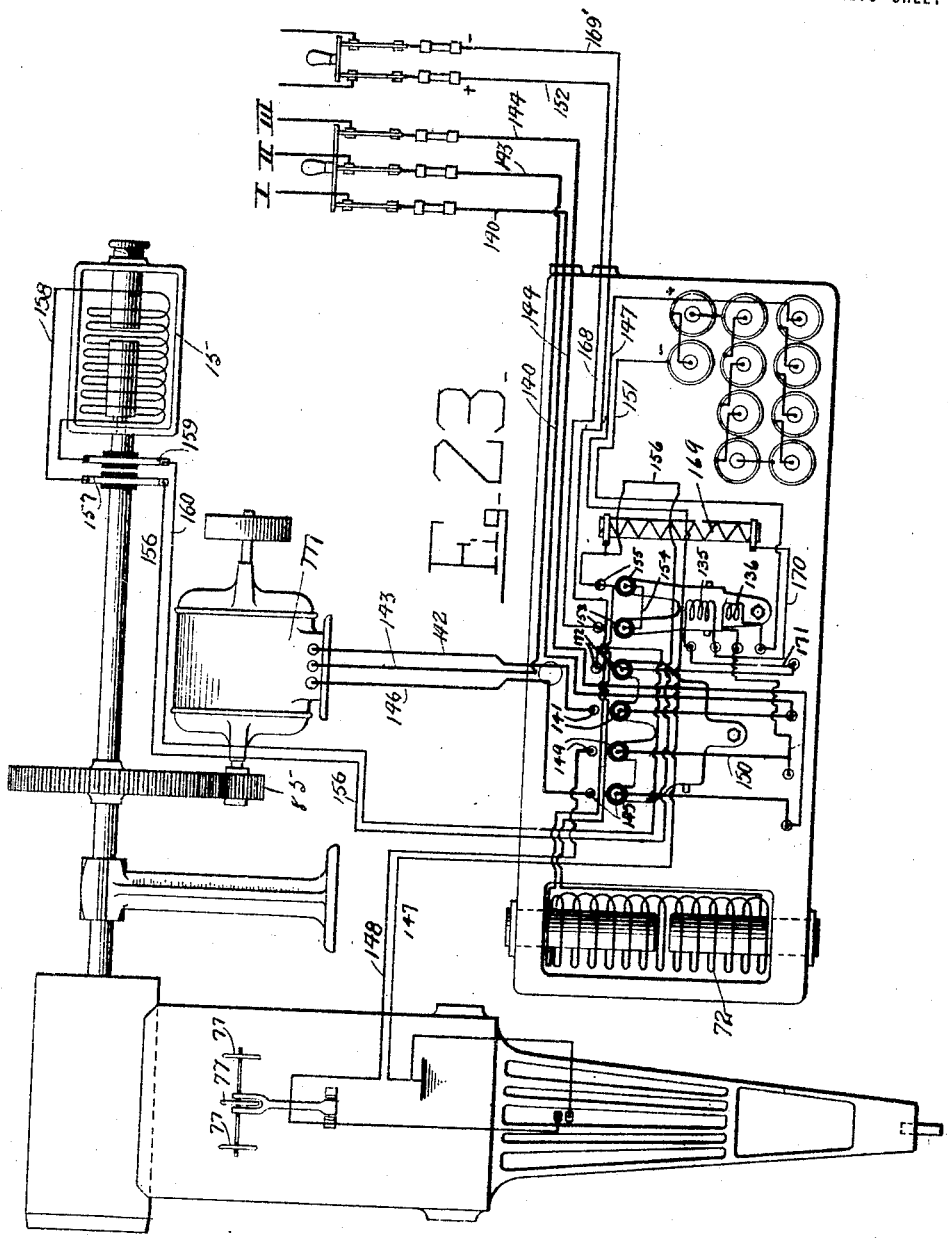

UNITED STATES PATENT OFFICE.

AUGUST SUNDH, OF HASTINGS-UPON-HUDSON, NEW YORK.

AUTOMATIC BLOCKING MECHANISM FOR STRIP-MILLS.

1,326,989. Specification of Letters Patent. Patented Jan. 6, 1920.

Application filed November 21, 1917. Serial No. 203,267.

*To all whom it may concern:*

Be it known that I, AUGUST SUNDH, a citizen of the United States, residing at Hastings-upon-Hudson, in the county of Westchester and State of New York, have invented new and useful Improvements in Automatic Blocking Mechanism for Strip-Mills, of which the following is a specification.

My invention relates to an improvement in strip blocking mechanism, and particularly to that type of machine wherein metal strips, after passing through the strip mill, will be automatically attached to blocking mechanism and wound or coiled thereon.

It is an object of this invention to provide such an apparatus that the strip may be blocked without personal attention on the part of the operator, thus removing the cause of frequent and sometimes serious accidents prevalent in strip blocking machines wherein the operation is partially or wholly performed by hand.

Before passing to a detailed description of my apparatus, I shall set out here in more or less general terms, the principle and operation of my device, as an aid to a full and complete understanding of the apparatus which I shall describe fully in detail later on.

The block on which the strips are wound, comprises a cylindrical, sectional casing, having a slot or strip-receiving opening in its periphery, and extending longitudinally thereof, by means of which the strip may enter to the interior of the casing, there to be attached to it. Initially this casing is standing still, but may be rotated into position to bring the slot into position to receive the strip by means of a hand wheel. In order that this slot, after the casing has been properly adjusted, be held in such position, it becomes necessary to provide some holding mechanism therefor, and I have provided means for this purpose, which while adapted to hold the casing in proper position initially, nevertheless will be automatically released at the proper instant, to permit the casing to be rotated and the strip to be coiled thereon.

Within the casing, I have provided mechanism for clamping the strip thereto, this mechanism, after the strip has been clamped, acting also as a clutch to rotate the whole block. In order to take care of wear of the clamping mechanism and also to provide for blocking strips of varying thickness, the clamping mechanism is adjustable. To drive this mechanism, and thereby the block as a unit, I have provided an alternating current electric motor, it being understood, of course, that the type of motor used is optional with the user. The circuit of this motor is controlled manually; mechanical brake mechanism provided for the motor, being arranged to be released by operation of the switch which controls the motor, so that as the motor circuit is closed, the brake will lift to permit the motor to rotate. The motor is connected to the block through a fluid clutch, which is adjustable and capable of being set so as to cause the strips to be wound under practically constant tension.

As in machines of this character, the block is placed some distance from the strip mill, it becomes necessary to provide some guiding mechanism to guide the strip in its passage from the strip mill to the block. I have provided guiding mechanism for this purpose, which is actuated into guiding position manually, at the same time, and by the same operating lever used in closing the main switch which controls the motor, but which is automatically moved out of guiding position when the strip is attached to the block. I have provided mechanism, also, whereby, should for any reason the strip buckle and plug in its passage through the guides, the latter will automatically move out of guiding position and release the strip, so as to prevent injury to the machine, manually operable means being provided for this purpose also. This is true only up to the time that the strip reaches the block and is attached thereto, for it will be understood that after the strip has been attached to the block, the guiding mechanism is moved out of operative position, and the strip being wound under tension will not buckle.

Sometimes it is necessary to coil strips of such a thickness that they cannot be handled by a blocking machine, and for this purpose a machine known in the art as a coiler is used. Therefore, in order that the same strip mill which I use with my blocking machine may be available for use with a coiler, I have arranged my present apparatus so that it may be moved bodily away from in front of the strip mill, so that a coiler may be substituted therefor. It is necessary also that the block be parallel with the rolls of the strip mill when using the apparatus, and I have provided means in connection with the present apparatus, so that it may be adjusted accurately and with facility, and after once being set, should the blocking machine be moved for the purpose of using a coiler, it can be moved right back into place without any trouble and with the assurance that the block will be parallel with the strip mill rolls.

The whole apparatus is controlled electrically, and automatically, it being necessarily merely to close a main switch by hand, and feed the strip through the strip mill. Closure of the main switch will close the main motor circuits, to start the driving motor which drives the strip attaching mechanism; and also closes several contacts which are in the circuit for various electromagnets necessary for the operation of the machine. One magnet is provided for the purpose of actuating the strip-attaching mechanism to attach the strip to the block. This magnet receives its current from a source of direct current supply, but its circuit is not closed until an electro-magnet having two windings, one of which receives its energy from batteries, closes a relay, the battery circuit being controlled by the strip in its movement through the guiding mechanism, and both circuits being controlled by the main switch already referred to. The guiding mechanism is controlled by means of another electromagnet, the circuit for which is controlled by the main switch, and by the strip itself. The guiding mechanism is brought into operative position manually, at the same time the main switch is closed, but so soon as the strip is attached to the block, the guiding mechanism is automatically withdrawn. If for any reason the strip should become buckled and plugged in its travel through the guiding mechanism, before becoming attached to the block, the guiding mechanism will be automatically withdrawn and thus prevent injury to the machine.
In a machine of this character, therefore, it becomes necessary for the operator merely to operate the lever controlling the main switch, and then insert the end of the strip in the strip mill.
In the drawings accompanying this application, Figure 1 is an elevation of the machine; Fig. 2 is a plan view; Fig. 3 is an end elevation of the block and side elevation of the guiding mechanism; Fig. 4 is a part sectional elevation view taken from the opposite side of the machine from that of Fig. 3; Fig. 5 is a part sectional side elevation showing in section the driving mechanism and the operating mechanism for the strip attaching device for the machine; Fig. 6 is a longitudinal section through the block and strip attaching mechanism; Fig. 7 is a cross section of the block and strip clamping mechanism, taken on the line A—A of Fig. 6; Fig. 8 is an end elevation of the block and strip attaching mechanism; Fig. 9 is a view taken on the line B—B of Fig. 6; Fig. 10 is a part sectional elevation view of the guiding mechanism showing it in guiding position; Fig. 11 shows in elevation part of the guiding mechanism with a strip buckled and plugged therein; Fig. 12 is an enlarged elevation of the strip contact mechanism; Fig. 13 is a plan of the mechanism of Fig. 12; Fig. 14 is a part sectional elevation of the apparatus of Fig. 13, looking from left to right; Fig. 15 shows in elevation the main and auxiliary switches; Fig. 16 is an elevation of the main switch mechanism of Fig. 15, looking from left to right; Fig. 17 is an elevation of the auxiliary switch of Fig. 15, also looking from left to right; Fig. 18 is an elevation view showing the arrangement of the batteries, switches, etc.; Fig. 19 is a view taken on the line C—C of Fig. 5; Fig. 20 shows the operating mechanism for the main switch; Fig. 21 is a plan of part of the mechanism of Fig. 20; Fig. 22 is a part sectional elevation view of the clutch mechanism showing the means whereby leakage of fluid from the clutch is taken care of; Fig. 23 is a diagrammatic plan of the whole machine showing the various circuits therefor; Figs. 24, 25 and 26 are wiring diagrams showing the various circuits for the control and operation of the machine; and Fig. 27 is a fragmentary view showing the end of the bed plate on which the machine rests and the mechanism whereby the block may be readily adjusted relatively to the strip mill rolls.

Like characters of reference designate like parts throughout the various figures of the drawings.

*The block.*

Referring now to Figs. 1, 2, 5, 6, 7, 8 and 9, I shall describe the block, or member on which the strip is wound, and the mechanism by which the strip is attached thereto. I have provided a cylindrical shell, made up of four sections, designated 1, 2, 3, 4, hinged together. The sections 1, 3 and 4 are supported by the section 2, which in turn is secured to a member 5, by means of screws 6, 6. The member 5 is carried by a hollow shaft 7, extending longitudinally of the block, throughout its entire length, this shaft at its right hand end, as viewed in Fig. 5, being secured to a shaft 7', passing through bearings 8, 8, in supports 9, 9, carried on the bed of the machine. Between the sections 1 and 4 of the block, a strip-receiving longitudinal slot 10 is left, this slot being wide enough for the reception of the thickest strip blocked, but being capable of being partially closed when the strip has become attached to the block, so as to present a practically unbroken cylindrical surface for the strip to be coiled upon. As the slot must be in position to receive the strip as it comes from the strip mill, I have provided adjusting means for the block, comprising a hand wheel 11 (see Fig. 6) which surrounds the end of the section 2 of the block and is secured thereto and to the member 5 by the screws 6 already mentioned. Inasmuch as the member 5 is rotatable on the hollow shaft 7, it is apparent that by movement of the hand wheel 11, the slot 10 in the block may be brought into strip receiving position. The block after being adjusted is held in position by means of a member 12, which engages a detent 13 (see Figs. 3 and 4) formed in the member 5. The operation of this member will be taken up later on. Carried within the hollow shafts 7 and 7' and extending throughout practically their entire length, is a shaft 14, adapted to be moved longitudinally thereof and to the right as viewed in Fig. 5, by means of an electromagnet 15, secured to and carried at the right hand end of the hollow shaft 7', the end of this shaft 14, which is reduced in diameter, being screwed into the core 16 of the magnet. A coil spring 17 is carried by the shaft 14, one end abutting a shoulder 18 formed on the shaft, and its other end abutting the end of the magnet 15. From Fig. 5 it will be seen that the shaft 14 when pulled to the right by energization of the magnet 15, will be actuated in the opposite direction under the action of the spring 17, when the magnet is deënergized. The bore of the block is tapered, and extending into this bore is a hollow tapered plug 19, adapted to be moved longitudinally of the block by movement of the hollow shaft 14, through mechanism presently to be described, to attach the strip to the block or release it therefrom as the case may be. This plug or strip-attaching member is operatively connected to the shaft 14, by means of gears 20, 20, mounted on supports 21 integral with the shaft 7, pinions 22, 22, being carried by the supports 21 and adapted to rotate with the gears 20, 20. These pinions mesh with gears 23, 23, carried by the supports 21, 21, the gears 23 being let into the shaft 7 so that their teeth engage rack teeth 24, 24, cut into the surface of the shaft 14. As shown in Fig. 7, the gears 23, 23, are preferably set opposite each other across the center line of the shaft 14. Teeth 25, 25 are cut in the bore of the plug or strip-attaching member 19, and engage the gears 20. The bore of the strip attaching member 19 is straight. If the rod 14 be actuated, the plug 19, through the medium of the train of gearing just described, will be moved longitudinally of the block, and inasmuch as the bore of the block is tapered and likewise the periphery of the member 19, the member 19 will approach or retire from the block, to either attach the strip to the block or release it, as the case may be. For the purpose of guiding the member 19 in its movement, I have provided members 26 on the inside of the member and extending inwardly therefrom, four in all, these members having a tongue and groove connection with laterally extending members 27 formed on the shaft 7. In order that I may adjust the space between the strip attaching member 19 and the inside of the block, to accommodate the block to strips of varying thickness, I have arranged the stationary core 28 as shown in Fig. 5. That is to say the core is screwed into the magnet frame, and of course by screwing this core in and out, the amount of movement of the shaft 14 and therefore of the strip-attaching member 19 is varied as desired. The core 28 is held in adjusted position by means of a lock nut 29.

*Strip guiding mechanism.*

The mechanism for guiding the strips from the strip mill rolls to the block, will now be described, this mechanism being best illustrated in Figs. 1, 2, 3, 4, 10, 11 and 23. The guiding mechanism comprises upper and lower guide members 30 and 31, respectively, supported by standards 32 and 33 attached to the bed plate of the machine. Carried at the ends of the guide members adjacent the strip mill rolls, are steel plates 34, which are always kept in engagement with the mill rolls. These plates are beveled and are provided for the purpose of scraping the strip from the rolls of the mill, for as the strips are put through the strip mill under pressure they are inclined to stick to the rolls. In the upper guide member, 30, I have provided a hinged section 35, hinged at the end most distant from the strip mill, and designated 36 on the drawings. Ordinarily this hinged section is in the position shown in Fig. 10, and is maintained in such position by the spring 37. But, should for any reason, the strip buckle and plug in passing through the guides, the buckled strip, designated 38 in Fig. 11, will raise the section 35 to the position shown in Fig. 11 to close contacts 39 and 40 to cause the guide members to be moved out of guiding position in a manner hereinafter described. A lever 41 is mounted on a rod 42 carried at the top of the stands 32 and 33, this lever carrying at its outer end a coil spring 43, the other end of which is secured to the upper guide member 30. The lever 41 is adjustable on the shaft 42 and is set so that the spring 43 will always be under tension to cause the plate 34 carried by the guide member 30 to always be in firm engagement with the upper roll of the strip mill. The lower guide member carries a coil spring 44, secured to any suitable part of the body or frame of the machine by a turn buckle 45, this spring being provided for the purpose of always maintaining the lower plate 34 carried by the guide member 31 in firm engagement with the lower mill roll. In machines of this character, the strips are blocked or wound under tension so as to make a nice smooth coil, and therefore after the strip has once been attached to the block, it is no longer necessary to guide it, and for this reason I have provided mechanism to move the guides out of guiding position after the strip has been attached to the block, and to move them back again to guiding position when it is desired to coil or block the next strip. The upper guide member 30 has passing through it a rod 46, this rod being connected to links 47 by passing through a slot in the ends of the latter. The links 47 are in turn pivotally connected to a pair of levers 48 carried by and connected to a rotatable rod 49 passing beneath the guide members through the stands 32 and 33. The rod 46 has vertical movement relatively to the stands 32 and 33 being guided in such movement by slots 50, 50, cut in the stands. The lower guide member 31 has secured thereto a link 51, which is pivotally secured to a lever 52 carried by and keyed to the rod 49. A chain 53 to the lower end of which a weight 54 is attached passes over a pulley 55 carried by a bracket 56 and around a pulley 57 to which it is fastened, said pulley being mounted on the rod 49. Another pulley 58 is also carried by the rod 49, and has secured thereto one end of a chain 59, the other end of which passes around a sheave 60 mounted on a rod 61 carried by the frame of the machine, and is secured to the end of a lever 62 carried by a rod 63 which is mounted on the frame of the machine. An operating lever 64 formed integral with the lever 62, is adapted when moved to the right, as viewed in Fig. 3, to swing the lever 62 upwardly about the rod 63 and thereby, through the medium of the chain 59, rotate the pulley 58 in an anti-clockwise direction. The pulleys 58 and 57, to the latter of which the chain 53 carrying the weight 54 is attached, are connected to the rod 49, and as one end of the chain 53 carrying the weight is fastened to the pulley 57, rotation of the pulley 58 will cause the weight 54 to move upwardly. At the same time the end of the upper guide member 30 will be moved downwardly and the lower guide member 31 will be moved horizontally toward the block, until the guide members are in the position shown in Fig. 10. As the weight 54 is now suspended in the air, it becomes necessary to provide means for holding it in such a position, and to this end I have provided a cam 65 mounted on the rod 49, this cam being adapted, when the guides are moved to guiding position, to engage one end of a lever 66 carried by a rod 67 mounted on a bracket 68 forming part of the frame of the machine. This rod 67 carries the member 12 which is adapted to engage the detent 13 to hold the block stationary until the strip is attached thereto, and also carries a bell crank lever 69, the latter carrying a weight 70. Attached to one end of the lever 69 is the core 71 of an electromagnet 72, the energization of which is controlled by the strip, as will be explained later on. Energization of this magnet will cause it to pull in its core, which will actuate the levers 12 and 66 to move the former out of engagement with the detent 13, and the latter out of engagement with the cam 62. The weight 54 is then free to drop and move the guides 30 and 31 into the position shown in Fig. 3. If desired, however, these guides may be moved out of guiding position by merely actuating the lever 69 manually, which being attached to the core of the electromagnet 72 will move the same inwardly, just as though the magnet had been energized. This is merely an emergency operation, however, as ordinarily the magnet 72 will be energized and do its work.

*Strip contact mechanism.*

The strip contact mechanism comprises a frame 73 bolted to the upper guiding member 30, this frame carrying a rod 75 extending longitudinally thereof. The frame 73 has been shown secured to the guiding member by means of screws 74. A member 79 is carried by the rod 75 and is adapted to be moved longitudinally thereof, being held in any desired position by means of a thumb screw 80, the end of which passes through the member 79 and engages the frame 73. A member 76 straddling the member 79 is also carried by the rod 75 on which it has rotary movement. The member 76 which extends at right angles to the rod 75, carries contact rollers 77, which are let down through the upper guide member, and when the guiding members are in guiding position rests on a strip of insulation 81 carried by the lower guiding member. The other end of the member 76 carries a weight 78, which is provided for the purpose of regulating the pressure with which the contact roller bears on the strip being coiled. This weight is held in adjusted position by means of a thumb screw 82. The frame 73 is insulated from the guiding member 30 by insulation 83, and the bolts 74 are also insulated by insulation 84.

*Clutch and driving mechanism.*

The fluid clutch and driving mechanism are best illustrated in Figs. 5 and 22 and comprise an electric motor M, shown as an alternating current motor, this motor being mounted on the bed of the machine. Secured to the armature shaft of the motor is a gear 85 meshing with a large gear 86. The latter has secured to it a clutch housing 87 and a clutch housing cover 88 is secured to the housing 87. Within the housing 87 and mounted on the shaft 7′, to which it is keyed (the shaft 7′ being secured to the shaft 7 carrying the block) is a gear 89, this gear meshing with a gear 90 mounted on a pin 91 having bearings in the clutch housing 87 and clutch housing cover 88. The clutch is preferably filled with oil. From the foregoing, it will be apparent that energization of the motor M will cause the gears 85 and 86 to rotate, which through the medium of the gears 89 and 90, and the fluid with which the clutch is filled will cause the shaft 7′ to rotate so long as all the fluid within the clutch is not allowed to by-pass. In order that the strips may be blocked under a practically constant tension, that is to say, so that when the pressure within the clutch, due to a strip being blocked, tends to rise above a predetermined value there will be a slip between the block and the driving motor M; I have provided pressure regulating means which will now be described.

This mechanism comprises a valve 96 controlling a port 97 communicating with the pressure side of the clutch. It will be obvious, therefore, that regulation of this valve will vary the pressure within the clutch. The valve is seated by a spring 98 capable of adjustment by a stem 99, the valve being held in adjusted position by a lock nut 100. In practice the valve 97 is set for a certain predetermined pressure and so long as the pressure within the clutch does not rise above this predetermined pressure the valve, of course, remains seated. So soon, however, as the pressure in the clutch, due to the strip being blocked, tends to rise above this value as it will, owing to the diameter of the roll increasing as the strip is being blocked, the valve 97 will lift against the action of the spring 98 to permit more fluid to by-pass, than has been permitted to by-pass previously, thereby reducing the pressure in the clutch to the predetermined amount for which the machine is set to cause the strip to be wound under a practically constant tension.

*Mounting for the machine.*

The supports 9 carrying the block, etc., and the motor M are mounted on a bed plate B, which in turn is mounted on a plate C bolted to the floor. The plate B is capable of being adjusted longitudinally of the plate C, and is held in adjusted position by bolts D, which pass through the plates B and C.
The apparatus is so constructed in order that the block may be readily adjusted longitudinally with respect to the mill rolls, for it is to be understood that the strips are fed from time to time through the mill at different points in order that the mill rolls will be worn more or less evenly across their face.

In order that the block may easily be adjusted to be exactly parallel with the mill rolls, I have provided a hole in the end of the plate C, in which fits a plug 101, this plug having a boss at the bottom thereof eccentric thereto, this boss extending downwardly into a hole in the floor. A holding member 102 holds the plug in position relative to the plate. When it is desired to swing the whole machine from in front of the strip mill, the bolts holding the plate C to the floor are taken out and the whole machine may then be swung about the eccentric boss at the bottom of the plug 101. When swung back again into place there is no more adjustment of the plug 101 required. In other words after once being set up, the machine may be swung away from the strip mill whenever desired, and then swung back again into exact position without any further adjustment.

*Main switch and relay and their operation.*

The switches controlling the operation of the machine and their operating mechanism are illustrated in Figs. 1, 15 to 18, inclusive, 20 and 21. The main switch is designated 103 and is mounted for rotation on a rod 104 carried in supports 105. The switch has four arms 106, 107, 108 and 109, each of which carries contacts and also has formed thereon bosses 110 engaging coil springs 111 for the purpose of opening the switch when it is desired to stop the motor. The switch is closed by means of the lever 64 which actuates the guides into guiding position. A chain 185 is attached to the lever (see Fig. 1), the other end of which is secured to a pulley 186 mounted on a rod 115. A foot pedal 112 is integral with a segmental gear 113 mounted on the rod or stud 61, this pedal being available also to close the main switch. This segmental gear meshes with a gear 114 mounted on the rod 115 already referred to.
This rod passes through a slot 116 in a rod 117 one end of which is connected to a rod 118 secured to the switch 103. Carried by the rod 115 is a cam 119 adapted to be held in position by a set screw 120. This cam engages a shoulder 121 formed on the shaft or rod 117. Now if the lever 64 be actuated or the pedal 112 be depressed, the shaft 115, and therefore the cam 119, will be rotated to force the rod 117 to the left as viewed in Fig. 20, which by its connection to the rod 118 will close the switch 103. Carried by the rod 115 at its extreme outer end is a cam 121, on which rests the end of a brake shoe 122, which is adapted to engage a brake pulley 123 on the motor armature shaft. This shoe carries a weight 124 for the purpose of applying the brake. The cam is so set, that when the lever 64 is actuated to close the main switch in the manner just described, the cam 121 will lift the brake shoe 122. A pedal 125 is integral with the pedal 112, and when depressed it will move the cam 121 so that the brake may go on again, and also at the same time move the cam 119 away from the projection 121 on the rod 117 and permit the springs 111 to open the switch arms 106, 107, 108 and 109, returning the rod 117 relative to the cam 119 to the position shown in Fig. 20.

The auxiliary switch or relay 130, controlled by the main switch 103 is provided for the purpose of controlling the winding 15 and the magnet 72. The relay comprises arms 131 and 132 carrying contacts, these arms being pivoted on the rod 133 and adapted to be actuated by an electromagnet having two windings 135 and 136. The winding 136 is adapted to receive current from batteries 137, the battery circuit being controlled by the strip in its passage through the guides. The winding 135 receives its energy from a source of direct current, and this winding is provided for the purpose of maintaining the relay closed throughout the coiling operation; for as the guiding mechanism is moved out of guiding position after the strip has been once attached to the block, the winding of the relay which is controlled by the strip will be deënergized at that time, therefore, in order that the electromagnet 15 be energized throughout the blocking operation, the relay 135 is maintained energized independently of the position of the strip in the guides.

In order that the machine as a whole may present a good appearance, I have placed the batteries for supplying current to one of the windings of the relay, the relay itself, the main switch, and the electromagnet controlling the weight for actuating the guides, all in one compartment or receptacle at the side of the machine, where they also will be readily accessible for repairs of any kind, etc.

A cycle of operation.

I shall now proceed to describe a complete cycle of operation of the whole apparatus. Initially, the guiding mechanism is in the position shown in Fig. 3, for instance. The operator grasps the lever 64, and pulls it to the right as viewed in Fig. 3, which will act through the lever 62 and chain 59 to rotate the pulleys 58 and 57 to pull the weight 54 upwardly, and at the same time actuate the guiding members 30 and 31, through the levers 48 and 52, and links 47 and 51, into the position shown in Fig. 10, which is their strip-guiding position. Actuation of the lever 64 at the same time causes the cam 65 to be rotated into position to engage the lever 66 to hold the weight 54 suspended in the air by the chain 53. The lever 64 is then returned to the position shown in Fig. 3. The block may then be rotated, by means of the hand wheel 11, into position to bring the strip receiving slot 10 abreast of the end of the guiding members 30 and 31, as shown in Fig. 10, at which time the end if the lever 12 will engage the detent 13 to maintain the block in such adjusted position. The block is now ready to receive the strip. Movement of the lever 64 to adjust the guiding mechanism, also, through the chain 185, rotates the rod 115, which actuates the cam 119 to close the main switch 103, and at the same time actuates the cam 121 to lift the brake shoe 122. Closure of the switch 103 will close the circuits of the motor M, which may be traced as follows: from the main designated I, conductor 140, contacts 141, 141, conductor 142, through the motor M, conductor 143, and out at II; also from the main designated III, conductor 144, contacts 145, conductor 146, through the motor M, and out at II. The motor, the brake being lifted, will now start to rotate, and through the clutch mechanism of Figs. 5 and 22, will rotate the shafts 7' and 7, and through them the strip-clamping member 19 of Fig. 6. At this time, however, the member 19 is in the position shown in Fig. 6, and consequently the block remains stationary.

The strip may now be inserted between the rolls of the strip mill, designated SM, and will be fed thereby between the guide members 30 and 31. As the strip reaches and engages the contact roller 77, a circuit will be closed for the winding 136 of the relay 130, from the batteries, one side of the latter being rounded on the guides or any suitable part of the machine. This circuit may be traced as follows: from the plus side of the batteries, by way of conductor 147, grounded on the lower guide member 31, through the strip, contact roller 77, conductor 148, contacts 149, controlled by the switch 103, and now closed, conductor 150, winding 136 of the relay, and conductor 151 to the minus side of the batteries.

With this winding of the relay energized, the relay 130 will close, to close circuits for the windings of the magnet 15 controlling the attachment of the strip to the block, and the magnet 72 controlling the guiding mechanism. The circuit for the winding of the magnet 15 may be traced as follows: from the plus side of the outside source of direct current, conductor 152, contacts 153 controlled by the relay, conductor 154, contacts 155 also controlled by the relay, conductor 156, contact 157 of the magnet 15, conductor 158, winding of the magnet 15, contact 159, conductor 160, and out the minus side of the line. The contacts 157 and 159 of the magnet 15 are held in position by the levers 161 and 162 mounted on pins 163 and 164, respectively, which pins carry springs 165 and 166 to hold the contacts firmly in position. The circuit for the weight-controlling magnet 72, may be traced as follows: from the plus side of the same source of current as feeds the circuit just traced, conductor 152, contacts 153, conductor 154, contacts 155, conductor 167, winding of the magnet 72, conductors 168 and 169' to the minus side of the line. At this time, therefore, the winding of the magnet 15 being energized, the same will pull in its core, and through the rod 14 cause the member 19 to move inwardly longitudinally of the block. The parts are so timed that by the time the magnet 15 actuates the member 19, the strip will have entered the slot 10 in the block, and will therefore be attached to the block, between the member 19 and the inside of the block. At this same time, also, the winding of the magnet 72 being energized, it will pull in its core 71 and thereby move the lever 66 out of the way of the cam member 65, to allow the weight 54 to drop. Dropping of this weight will of course move the guides 30 and 31 out of guiding position. As the magnet 72 pulls in its core, it at the same time actuates the lever 12 out of engagement with the detent 13. The block is now free to rotate, and will rotate, being clutched, through the medium of the strip and the strip attaching member 19, to the motor M.

Should for any reason, say failure of current to the magnet 72, for instance, it be desired to operate the guiding mechanism and block holding member 12 by hand, the operator may merely move the lever 69 to the right as viewed in Fig. 4, which will force the core 71 of the magnet 72 downwardly to release the weight and allow it to drop, and at the same time actuate the lever 12 out of engagement with the detent 13.

So far, one of the windings only of the relay 130 has been energized, its circuit passing through the strip and being grounded on the guiding mechanism. But as the contact roller 77, which is in this circuit, is moved out of engagement with the strip so soon as the guides have been moved out of guiding position in the manner just described, it becomes necessary that the other winding of the relay be energized and maintained energized. The circuit for this winding, which derives its energy from the outside source of direct current, may be traced as follows: from the plus main, conductor 152, contacts 153, conductor 154, contacts 155, conductors 167, 168, resistance 169, conductor 170, winding of the relay designated 135, conductor 171, contacts 172 controlled by the switch 103, and out the minus side of the line.

The machine is now in full operation. As the tension on the strip increases, due to the increasing virtual diameter of the roll of metal, it tends to increase the pressure in the fluid clutch, the increased pressure will cause the valve 96 to lift to reduce the pressure to the proper amount, to cause the strip to be wound throughout the entire operation under practically constant tension, it being understood, of course, as I have already herein pointed out, that this tension may be varied by means of the member 99, adjustment of which will increase or decrease the tension under which the spring 98 is placed, and to the same degree vary the tension under which the strip will be blocked.

So soon as the strip is completely blocked, the operator depresses the pedal 125, which will rotate the rod 117 to cause the cam 119 to move so that the switch 103 will open under the action of the springs 111, and at the same time actuate the cam 121' to allow the brake shoe to go on under the action of the weight 124 carried thereby, to stop the motor, the circuits for which have now been opened by opening of the switch 103. At the same time the switch 103 is opened, the circuit of the winding 135 of the relay 130, which passes through one of the contacts carried by the switch 103, will be opened and the relay will drop open, opening the circuit of the winding of the magnet 15 controlling the strip attaching member 19 and opening also the circuit of the magnet 72 controlling the weight 54. As soon as the winding of the magnet 15 is deënergized, the rod 14 will be moved to the left, as viewed in Fig. 5, to cause the strip attaching member 19 to move to the left also, to release the strip. The coil of strip may now be removed bodily from the block, and if necessary the sections of the block hinged to the section 2 may be given a blow with the hand to collapse them sufficiently to permit the strip to be easily withdrawn, these sections falling outwardly again to cause the block to assume a cylindrical form when the block is rotated into position again to receive the next strip to be blocked.

In starting the strip through the guides, should by any chance the strip buckle, it would lift the member 35, forming part of the guiding member 30, into position shown in Fig. 11. This movement would close contacts 39 and 40, which would close a circuit to the winding 136 of the relay 130 to close the latter and thereby close a circuit to the winding of the magnet 72 controlling the weight. This would permit the weight 54 to drop to move the guides away from guiding position before any damage could be done to the apparatus by the buckling strip, the strip could then be cut off back of the strip mill rolls, the buckled part removed, and the guides moved back to guiding position again, to receive the strip which could again be started through the mill.

Having thus described my invention, what I claim as new, and desire to secure by Letters Patent of the United States is:—

1. In strip blocking apparatus, the combination of a block, a motor for driving the same, a manually operable switch controlling the motor, guiding mechanism for the strip, means for actuating the guiding mechanism to inoperative position, an electromagnet controlling said means, and a winding for said magnet the circuit for which passes through said switch.

2. In strip blocking mechanism, the combination of a block, a motor for driving the same, a manually operable switch controlling the motor, guiding mechanism for the strip, means for actuating the guiding mechanism to inoperative position, an electromagnet controlling said means, and a winding for said magnet the circuit for which passes through the said switch and is controlled by the strip.

3. In strip blocking mechanism, the combination of a block, a motor for driving the same, guiding mechanism for the strip, means for actuating the guiding mechanism to inoperative position, an electromagnet controlling said means, a winding for said magnet, and contact mechanism automatically actuated by the strip should the latter buckle for controlling the circuit of said winding.

4. In strip-blocking mechanism, the combination of a block, a motor for driving the same, guiding mechanism for the strip, means for actuating the guiding mechanism to inoperative position, an electromagnet controlling said means, a switch for controlling the motor, and a winding for said electromagnet controlled by the motor switch and the strip should the latter buckle in passing through the guiding mechanism.

5. In strip blocking mechanism, the combination of a block, a motor for driving the same, guiding mechanism for the strip, means for actuating the guiding mechanism to inoperative position, and electrically operated means the circuit for which passes through said motor controlling switch for automatically controlling said actuating mechanism.

6. In strip blocking mechanism, the combination of a block, a motor for driving the same, guiding mechanism for the strip, a switch controlling the driving motor, manually operable means for actuating the guiding mechanism into operative position and closing the motor controlling switch simultaneously, means for actuating the guiding mechanism to inoperative position, and electrically operated means controlled by the strip for controlling the last-named means.

7. In strip-blocking mechanism, the combination of a block, a motor for driving the same, guiding mechanism for the strip, a manually operable switch controlling the driving motor, means for actuating the guiding mechanism to inoperative position, and electromagnetically operated means controlling said guide actuating means the circuit for which passes through said switch, and is closed only when the motor controlling switch is in closed position.

8. In strip blocking mechanism, the combination of a block, a motor for driving the same, guiding mechanism for the strip, a manually operable switch controlling the driving motor, means for actuating the guiding mechanism to inoperative position, and electromagnetically operated means, the circuit for which passes through said switch, for controlling said guide actuating mechanism operable automatically and only when the motor controlling switch is in closed position and the strip at a predetermined point in its travel through the guiding mechanism.

9. In strip blocking mechanism, the combination of a block, a motor for driving the same, guiding mechanism for the strip, a manually operable switch controlling the driving motor, means for actuating the guiding mechanism to inoperative position, a double wound electromagnet controlling said guide actuating mechanism, the circuit for one winding of said magnet being controlled by the strip and passing through said switch, and the other being partially controlled by the first-named winding.

10. In strip blocking mechanism, the combination of a block, a motor for driving the same, guiding mechanism for the strip, a manually operable switch controlling the driving motor, means for actuating the guiding mechanism to inoperative position, a double wound electromagnet controlling said guide actuating mechanism, the circuit for one winding being controlled by the strip and passing through said switch, the circuit for the other winding passing through the switch and controlled by the first-named winding of the electromagnet.

11. In strip blocking mechanism, the combination of a block, a motor for driving the same, guiding mechanism for the strip, a switch controlling the driving motor, means for actuating the guiding mechanism to inoperative position, a double wound electromagnet controlling said guide actuating mechanism, two independent sources of power for supplying current to said magnet, the circuits therefor passing through said switch, and the flow of current to both windings being controlled by the strip.

12. In strip blocking mechanism, the combination of a block, a motor for driving the same, guiding mechanism for the strip, a switch controlling the driving motor, means for actuating the guiding mechanism to inoperative position, a double wound electromagnet controlling said guide actuating mechanism, two independent sources of power for supplying current to said magnet one of which comprises batteries, the battery circuit passing through said switch.

13. In strip blocking mechanism, the combination of a block, a motor for driving the same, guiding mechanism for the strip, a manually operable switch controlling the driving motor, means for actuating the guiding mechanism to inoperative position, a double wound electromagnet controlling said guide actuating mechanism, two independent sources of power for supplying current to said magnet, the circuits therefor passing through said switch, and the flow of current to both windings being controlled by the strip.

14. In strip blocking mechanism, the combination of a block, a motor for driving the same, means for attaching the strip to the block, an electromagnet for operating said means, and a manually operable switch for controlling the driving motor, the circuit for said electromagnet passing through the said switch.

15. In strip blocking mechanism, the combination of a block, a motor for driving the same, a manually operable switch for controlling said motor, means for attaching the strip to the block, an electromagnet for operating said means, and an electromagnetically operated switch, a circuit for which passes through said first-named switch for controlling the flow of current to the electromagnet for attaching the strip to the block.

16. In strip blocking mechanism, the combination of a block, a motor for driving the same, a manually operable switch controlling said motor, means for attaching the strip to the block, an electromagnet for operating said means, guiding mechanism for the strip, and an electromagnetically operated switch, a circuit for which passes through said first named switch and is controlled by the position of the strip in the guiding mechanism, for controlling the flow of current to the electromagnet.

17. In strip blocking mechanism, the combination of a block, a motor for driving the same, a manually operable switch controlling said motor, means for attaching the strip to the block, an electromagnet for operating said means, guiding mechanism for the strip, a double wound electromagnet, one winding of which receives current from the same source of power as the first named electromagnet, the other winding receiving its power from an independent source, this last winding controlling the flow of current to the other winding and to the winding of the first-named electromagnet, its circuit passing through the manually operable motor controlling switch.

18. In strip blocking mechanism, the combination of a block, a motor for driving the same, means for attaching the strip to the block, an electromagnet for operating said means, guiding mechanism for the strip, a double wound electromagnet, one winding of which receives current from the same source of power as the first-named electromagnet, the other winding receiving its power from an independent source, the last named winding being controlled by the strip in its passage through the guiding mechanism and controlling the other winding of the magnet and the first named electromagnet, and a manually operable switch for controlling the motor, through which passes the circuit for the electromagnet for operating the strip attaching means and for one winding of the double wound electromagnet.

19. In strip blocking mechanism, the combination of a block, a motor for driving the same, a manually operable switch controlling said motor, guiding mechanism for the block, means for actuating the guiding mechanism into inoperative position, means for maintaining the guiding mechanism in operative position, an electromagnet controlling said last named means, and an electromagnetically operated switch for controlling said electromagnet, the circuit for which passes through said manually operable switch.

20. In strip blocking mechanism, the combination of a block, a motor for driving the same, guiding mechanism for the block, means for actuating the guiding mechanism into inoperative position, means for maintaining the guiding mechanism in operative position, an electromagnet controlling said last-named means, a manually operable switch for controlling the motor, and an electromagnet controlled by the strip and for controlling the first-named electromagnet, its circuit passing through said manually operable switch.

21. In strip blocking mechanism, the combination of a block, a motor for driving the same, guiding mechanism for the block, means for actuating the guiding mechanism into inoperative position, means for maintaining the guiding mechanism in operative position, manually operable means for actuating the second-named means, and an electromagnet for automatically controlling said second-named means.

22. In strip blocking mechanism, the combination of a block, a motor for driving the same, guiding mechanism for the block, means for actuating the guiding mechanism into inoperative position, means for maintaining the guiding mechanism in operative position, an electromagnet automatically controlling said last named means, and an electromagnet receiving current should the strip buckle in the guiding mechanism for controlling said first-named electromagnet so that the latter will operate to cause the guiding mechanism to move to inoperative position.

23. In strip blocking mechanism, the combination of a block, a motor for driving the same, means for attaching the strip to the block, guiding mechanism for the block, means for actuating the guiding mechanism into inoperative position, means for maintaining the guiding mechanism in operative position, an electromagnet controlling said last named means, and an electromagnet receiving current should the strip buckle in its passage through the guide mechanism, and also when the strip has been attached to the block, for controlling said first-named electromagnet to cause the guide mechanism to be moved to inoperative position.

24. In strip blocking mechanism, the combination of a block, a motor for driving the same, electromagnetically operated means for attaching the strip to the block, guiding mechanism for the block, means for actuating the guide mechanism to inoperative position, and a manually operable switch for controlling the motor, the means for attaching the strip to the block and the means for actuating the guiding mechanism to inoperative position, the circuit for the strip attaching means passing through said switch.

25. In strip blocking apparatus, the combination of a block comprising a casing having an opening in its periphery, and mechanism within the casing longitudinally movable of the casing to clamp the strip between it and the inside of the casing, driving means for the block, and means for guiding the end of the strip into the opening in said casing.

26. In strip blocking apparatus, the combination of a block comprising a casing having an opening in its periphery, a member within the casing, means for moving said member longitudinally of the casing to clamp the strip between it and the inside of the casing, driving means for the block, and means for guiding the end of the strip into the opening in said casing.

27. In strip blocking apparatus, the combination of a block comprising a casing having a tapered bore and an opening in its periphery, a tapered member within the casing movable longitudinally of the block to clamp the strip between the casing and the tapered member, driving means for the block, and means for guiding the end of the strip into the opening in said casing.

28. In strip blocking apparatus, the combination of a block comprising a casing having a tapered bore and an opening in its periphery, a tapered member within the casing, a magnet for moving the tapered member within the casing and longitudinally thereof to clamp the strip between it and the inside of the casing, driving means for the block, and means for guiding the end of the strip into said opening in the casing.

29. In strip blocking apparatus, the combination of a block comprising a casing having a tapered bore and an opening in its periphery, a tapered member within the casing, a magnet for moving the tapered member within the block and longitudinally thereof to clamp the strip between it and the inside of the casing, means for guiding the end of the strip into said opening in the casing, and means for driving the block and the magnet as a unit.

30. In strip blocking apparatus, the combination of a block comprising a casing having a tapered bore and an opening in its periphery, a tapered member within said casing, means for guiding the end of the strip into said opening in the casing, an electromagnet, and means operatively connecting the core of said magnet to the tapered member within the block, to cause the strip to be attached to the block between the casing and said tapered member.

31. In strip blocking apparatus, the combination of a block comprising a casing having a tapered bore and an opening in its periphery, means for guiding the end of the strip into said opening, a tapered member within the casing, an electromagnet, gearing operatively connecting the core of said magnet to the tapered member within the casing, and means for energizing said magnet to cause it to move its core and thereby actuate the said tapered member into position to clamp the strip between it and the inside of said casing.

32. In strip blocking apparatus, the combination of a block comprising a casing having a tapered bore and an opening in its periphery, means for guiding the end of the strip into said opening, a tapered member within the casing, an electromagnet, a hollow shaft carrying said magnet, a hollow shaft connected to said first named shaft, for supporting the block, means operatively connecting said tapered member and the core of said magnet to transmit movement of the core of the magnet to said tapered member, and actuating means formed on the said second named shaft for guiding the tapered member when the latter is actuated by movement of the core of the magnet.

33. In strip blocking apparatus, the combination of a block comprising a casing having a tapered bore and an opening in its periphery, means for guiding the end of the strip into this opening, a magnet having a core operatively connected to a tapered member within the casing, to actuate the said tapered member longitudinally of the casing to clamp the strip between it and the inside of the casing, and means for adjusting the amount of movement of said core to accommodate the block to strips of varying thicknesses.

34. In strip blocking apparatus, the combination of a block having an opening in its periphery, means for guiding the end of the strip into this opening, a hollow shaft supporting the block, a member at the other end of said shaft, a member within the block for attaching the strip to the block, operatively connected to the member at the end of the shaft, and means for controlling the action of the latter member to accommodate the block to strips of varying thicknesses.

35. In strip blocking apparatus, the combination of a block, supporting means therefor, fluid clutch mechanism carried by said supporting means, and a motor operatively connected to said clutch mechanism for driving the block.

36. In strip blocking apparatus, the combination of a block, a shaft carrying said block, a second shaft having a positive connection with said first named shaft, an electric motor, and fluid clutch mechanism carried on said second named shaft and operatively connected to said motor.

37. In strip blocking apparatus, the combination of a block, supporting means therefor, fluid clutch mechanism carried by said supporting means, means forming a part of said clutch mechanism whereby fluid leaking from the clutch will be forced to the exhaust side of said clutch, and a motor for driving the block, operatively connected to said clutch mechanism.

38. In strip blocking apparatus, the combination of a block, supporting means therefor, fluid clutch mechanism carried by said supporting means, a motor for driving the block, operatively connected to said clutch mechanism, and means for regulating the pressure in said clutch mechanism automatically to cause the strip to be wound under practically constant tension.

39. In strip blocking apparatus, the combination of a block, supporting means therefor, fluid clutch mechanism carried by said supporting means and positively connected thereto, and a motor for driving the block through said fluid clutch mechanism.

40. In strip blocking apparatus, the combination of a block, electrically operated means for attaching the strip to the block, guiding mechanism for the strips, a contact in the path of the strip in passing through the guiding mechanism, for controlling the operation of the strip attaching means, a rod, a member carried by and adjustable on said rod, and carrying said contact, and a member straddled by said first-named member for holding the latter in adjusted position on said rod.

41. In strip blocking apparatus, the combination of a block, electrically operated means for attaching the strip to the block, guiding mechanism for the strips, a contact in the path of movement of the strip in passing through the guiding mechanism for controlling the operation of the strip attaching means, a rod, a member carrying said contact adjustably mounted on said rod and extending transversely of the guiding mechanism, and means coöperating with said member for holding the latter in adjusted position.

42. In strip blocking apparatus, the combination of a block, electrically operated means for attaching the strip to the block, guiding mechanism for the strip, a contact in the path of movement of the strip in passing through the guiding mechanism, for controlling the operation of the means for attaching the strip to the block, a frame carried by and insulated from the guiding mechanism, and a member supporting said contact and supported by said frame.

43. In strip blocking apparatus, the combination of a block, electrically operated means for attaching the strip to the block, guiding mechanism for the strip, a contact in the path of movement of the strip in passing through the guiding mechanism for controlling the operation of the means for attaching the strip to the block, a frame carried by and insulated from the guiding mechanism, a rod carried thereby, and a member for carrying said contact adjustably mounted on said rod.

44. In strip blocking apparatus, the combination of a block, electrically operated means for attaching the strip to the block, guiding mechanism for the strip, a contact in the path of movement of the strip in passing through the guiding mechanism for controlling the operation of the means for attaching the strip to the block, a frame carried by and insulated from the guiding mechanism, a rod carried thereby, a member for carrying said contact adjustably mounted on said rod, and means engaging said frame for holding said contact carrying member in adjusted position.

45. In strip blocking apparatus, the combination of a block, electrically operated means for attaching the strip to the block, guiding mechanism for the strip, a contact in the path of movement of the strip in passing through the guiding mechanism, for controlling the operation of the means for attaching the strip to the block, a frame carried by and insulated from the guiding mechanism, a rod carried thereby, a member having a rocking movement on said rod and carrying said contact, and means carried by said member and adjustable thereon for regulating the rocking movement thereof on said rod.

46. In strip blocking mechanism, the combination of a block, driving means therefor, guiding mechanism for the strip, means for moving said guiding mechanism out of operative position, and a member forming part of the guiding mechanism for controlling said last named means to cause the guiding mechanism to move to inoperative position should the strip buckle in passing therethrough.

47. In strip blocking mechanism, the combination of a block, driving means therefor, guiding mechanism for the strip, means for moving said guiding mechanism out of operative position, and a member forming part of the guiding mechanism adapted to be actuated by the strip should the latter buckle in passing through the guiding mechanism for controlling the means for moving the guiding mechanism to inoperative position.

48. In strip blocking mechanism, the combination of a block, driving means therefor, guiding mechanism for the strip, means for moving said guiding mechanism out of operative position, and a member controlling said last named means for causing the guiding mechanism automatically to be moved to inoperative position should the strip buckle in passing therethrough.

49. In strip blocking mechanism, the combination of a block, driving means therefor, guiding mechanism for the strip, means for moving said guiding mechanism out of operative position, and a pivoted member forming part of the guiding mechanism and controlling said last named means for causing the guiding mechanism to be moved automatically to inoperative position when the strip buckles in its passage therethrough.

50. In strip blocking mechanism, the combination of a block, driving means therefor, guiding mechanism for the strip, means for moving said guiding mechanism out of operative position, a pivoted member forming part of the guiding mechanism and controlling said last-named means, to cause the guiding mechanism to be moved to inoperative position, should the strip buckle in passing therethrough, and means for normally holding said member in guiding position.

51. In strip blocking mechanism, the combination of a block, driving means therefor, guiding mechanism for the strip, means for moving said guiding mechanism into and out of operative position, plates carried at the end of the guiding mechanism, and adjustable means for always maintaining these plates in engagement with the rolls of a strip mill.

52. In strip blocking mechanism, the combination of a block, guiding mechanism for the strip, a motor for driving the block, a switch for controlling said motor, manually operable cam mechanism for closing said switch, and yielding means for automatically opening said switch when the cam mechanism is moved to neutral position.

53. In strip blocking mechanism, the combination of a block, guiding mechanism for the strip, a motor for driving the block, a switch for controlling said motor, cam mechanism for closing said switch, and means for moving the guiding mechanism into operative position and actuating the cam mechanism for closing said switch simultaneously.

54. In strip blocking mechanism, the combination of a block, guiding mechanism for the strip, a motor for driving the block, a switch controlling said motor, cam mechanism controlling said switch, a brake for the motor, and means for operating said cam mechanism to close the switch and simultaneously lift the brake.

55. In strip blocking mechanism, the combination of a block, guiding mechanism for the strip, a motor for driving the block, a switch controlling said motor, cam mechanism controlling said switch, a brake for the motor, and means for simultaneously closing the switch, lifting the brake and actuating the guiding mechanism to operative position.

56. In strip blocking mechanism, the combination of a block, guiding mechanism for the strip, a motor for driving the block, a switch controlling said motor, a brake for the motor, and means operative to simultaneously move the guiding mechanism to operative position, close the motor switch and lift the brake.

57. In strip blocking mechanism, the combination of a block, guiding mechanism for the strip, a motor for driving the block, a switch controlling said motor, means for simultaneously closing said switch and moving the guiding mechanism into operative position, and means manually operable to actuate the guiding mechanism to inoperative position with the motor switch closed.

58. In strip blocking mechanism, the combination of a block, guiding mechanism for the strip, a motor for driving the block, a switch controlling said motor, and means operative simultaneously to actuate the guiding mechanism to operative position and close said switch.

59. In strip blocking mechanism, the combination of a block, guiding mechanism for the strip, a motor for driving the block, a switch controlling said motor, means for simultaneously actuating said guiding mechanism to operative position and closing said switch, means for actuating said guiding mechanism to inoperative position without disturbing the said switch, and separate means for actuating the switch to open position after the strip has been blocked.

60. In strip blocking mechanism, the combination of a block, guiding mechanism for the strip, a motor for driving the block, means for simultaneously actuating the guiding mechanism to operative position and starting up the motor, means for automatically actuating the guiding mechanism to inoperative position after the strip has become attached to the block, and additional means for actuating the guiding mechanism to inoperative position automatically without disturbing the motor should the strip buckle in the guiding mechanism.

61. In strip blocking mechanism, the combination of a block, guiding mechanism for the strip, a motor for driving the block, means for simultaneously actuating the guiding mechanism to operative position and starting up the motor, means for automatically actuating the guiding mechanism to inoperative position after the strip has become attached to the block, means for actuating the guiding mechanism to inoperative position manually, and additional means for actuating the guiding mechanism to inoperative position automatically without disturbing the motor should the strip buckle in the guiding mechanism.

62. In strip blocking mechanism, the combination of a block, a motor for driving the same, means for holding the block stationary initially, means for guiding the strip, electrically operated means for attaching the strip to the block, means for actuating the guiding mechanism to inoperative position, means for maintaining the guiding mechanism in operative position, electrically operated means for controlling said first named means and the holding means for the block, and a switch for controlling the driving motor, the circuit for the last named electrically-operated means passing through said switch.

63. In strip blocking mechanism, the combination of a block, a motor for driving the same, a lever engaging a detent in the block, for holding the block stationary; guiding mechanism for the block, a weight for actuating said guiding mechanism to inoperative position, a cam for maintaining the guiding mechanism in operative position, and manually operable means for actuating said lever to release the block, and simultaneously actuating said cam to cause the weight to actuate the guiding mechanism to inoperative position.

64. In strip blocking mechanism, the combination of a block, a motor for driving the same, a lever engaging a detent in the block for holding the block stationary, guiding mechanism for the block, a weight for actuating said guiding mechanism to inoperative position, a cam for maintaining the guiding mechanism in operative position, manually operable means for actuating said lever to release the block and simultaneously actuating said cam to cause the weight to actuate the guiding mechanism to inoperative position, and means automatically operable for performing the same function as the said manually operable means and independently thereof.

65. In strip blocking mechanism, the combination of a block, a motor for driving the same, guiding mechanism for the strip, a plate for supporting said block, motor and guiding mechanism, a second plate on which the first named plate is adjustably mounted, and a member carried by the last-named plate for adjusting the block parallel to the strip mill.

66. In strip blocking mechanism, the combination of a block, a motor for driving the same, guiding mechanism for the strip, a plate for supporting said block, motor and guiding mechanism, a second plate on which the first-named plate is mounted for longitudinal adjustment, and a member carried by the last-named plate and having an eccentric extension thereon about which the plate may be moved, together with the mechanism carried thereby, to adjust the block with respect to the rolls of the strip mill.

67. In strip blocking mechanism, the combination of a block, driving means therefor, guiding mechanism for the strip, means for moving said guiding mechanism out of operative position, a member forming part of the guiding mechanism adapted to be actuated by the strip, should the latter buckle in passing through the guiding mechanism and controlling the means for moving the guiding mechanism to inoperative position, and manually operable means for moving said guiding mechanism to inoperative position should the strip buckle in passing therethrough.

68. In strip blocking mechanism, the combination of a block, guiding mechanism for the strip, a motor for driving the block, a switch controlling said motor, means for operating said switch to closed position, and additional means for simultaneously closing said switch and actuating the guiding mechanism to operative position.

69. In strip blocking mechanism, the combination of a block, guiding mechanism for the strip, a motor for driving the block, a switch controlling said motor, means for simultaneously closing said switch and actuating the guiding mechanism to operative position, and additional means for closing and opening said switch independently of the guiding mechanism.

70. In strip blocking apparatus, the combination of a rotatable block, guiding means for the strip, and automatic means for moving the guiding means to inoperative position, should the strip plug in passing to the block.

71. In strip blocking apparatus, the combination of a rotatable block, guiding members for the strip, and automatic means for separating said guiding members should the strip plug in passing to the block.

72. In strip blocking apparatus, the combination of a rotatable block, guiding means for the strip, and yielding means carried by said guiding means to automatically release the guiding means if the strip should plug in passing to the block.

73. In strip blocking apparatus, the combination of a rotatable block, and a plurality of means each of which is capable of establishing electric circuit for automatically clamping the strip to the block when the same reaches the block.

74. In strip blocking apparatus, the combination of a rotatable block, and a plurality of adjustable means each of which is capable of establishing an electric circuit for automatically clamping the strip to the block when the same reaches the block.

75. In strip blocking apparatus, the combination of a rotatable block, and a plurality of means any one of which when engaged by the strip establishes an electric circuit for automatically clamping the strip to the block when the same reaches the block.

76. In strip blocking apparatus, the combination of a rotatable block, upper and lower guides for the strip, a yielding contact carried by one of the guides, adapted to be engaged by the strip for establishing an electric circuit to automatically clamp the strip to the block, and means for varying the tension under which the contact engages the strip.

77. In strip blocking apparatus, the combination of a rotatable block, mechanism within the block, an electromagnet for operating said inner mechanism to clamp the strip, the motion of said inner mechanism being multiplied relatively to that of the electromagnet to obtain a wide range of movement of the inner mechanism.

78. In strip blocking apparatus, the combination of a rotatable block, guiding mechanism for the strips, means automatically to move the guiding mechanism out of guiding position in the normal operation of the apparatus, and additional means automatically to move the guiding mechanism out of guiding position if the strip buckles.

79. In strip blocking apparatus, the combination of a rotatable block, guiding mechanism for the strips, and a plurality of means automatically to move the guiding mechanism out of guiding position.

80. In strip blocking apparatus, the combination of a rotatable block, guiding mechanism for the strips, manual means for moving said guiding mechanism out of guiding position, means automatically to move the guiding mechanism out of guiding position, means to move the guiding mechanism automatically to non-guiding position if the strip buckles.

81. In strip blocking mechanism, the combination of a block, a shaft carrying the block, a variable speed clutch mounted on a shaft in alinement with the first-named shaft, and driving means for the block operatively connected to said clutch.

82. In strip blocking mechanism, the combination of a block, a shaft carrying the block, fluid clutch mechanism mounted on a shaft in alinement with the first-named shaft, and driving means for the block operatively connected to said clutch.

83. In strip blocking mechanism, the combination of a block, a shaft carrying the block, a variable speed clutch on a shaft in alinement with the first-named shaft, and driving means for the block operatively connected to said clutch.

84. In strip blocking mechanism, the combination of a block, a shaft carrying the block, a variable speed fluid clutch, a shaft in alinement with the first-named shaft, and driving means for the block operatively connected to said clutch.

85. In strip blocking mechanism, the combination of a block, a shaft carrying the same, driving means for the block, a fluid clutch mounted on a shaft in alinement with the block carrying shaft and forming a connection between the block and its driving means.

86. In strip blocking mechanism, the combination of a block, a shaft carrying the same, driving means for the block, a variable speed fluid clutch mounted on a shaft in alinement with the block carrying shaft and forming a connection between the block and its driving means.

87. In strip blocking mechanism, the combination of a block, a shaft carrying the same, driving means for the block, a variable speed clutch mounted on a shaft in alinement with the block carrying shaft forming a connection between the block and its driving means.

88. In strip blocking mechanism, the combination of a block, a shaft carrying the block, driving means therefor, a variable speed clutch mounted on a shaft in alinement with the first-named shaft, and means for adjusting the said clutch to vary the tension on the strip.

89. In strip blocking mechanism, the combination of a block, a shaft carrying the same, driving means therefor, and means connecting the driving means to the block whereby the latter may automatically come to rest when the tension of the strip exceeds a certain predetermined amount.

90. In strip blocking mechanism, the combination of a block, a shaft carrying the block, driving means therefor, and means connecting the driving means to the block whereby the latter may come to rest when the tension on the strip exceeds a certain pre-determined amount independent of rotation of the driving means.

AUGUST SUNDH.